(12) United States Patent
Kurasawa et al.

(10) Patent No.: US 10,296,150 B2
(45) Date of Patent: May 21, 2019

(54) DETECTION APPARATUS AND TOUCH DETECTION FUNCTION-EQUIPPED DISPLAY APPARATUS

(71) Applicant: Japan Display Inc., Tokyo (JP)

(72) Inventors: Hayato Kurasawa, Tokyo (JP); Yasuyuki Teranishi, Tokyo (JP); Hiroshi Mizuhashi, Tokyo (JP); Takeo Koito, Tokyo (JP); Shuji Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/662,599

(22) Filed: Jul. 28, 2017

(65) Prior Publication Data

US 2018/0039356 A1 Feb. 8, 2018

(30) Foreign Application Priority Data

Aug. 5, 2016 (JP) .................... 2016-154993

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| | | |
|---|---|---|
| 2007/0229464 A1 | 10/2007 | Hotelling et al. |
| 2009/0231305 A1 | 9/2009 | Hotelling et al. |
| 2011/0018826 A1 | 1/2011 | Shoji |
| 2012/0081332 A1 | 4/2012 | Atsuta et al. |
| 2014/0368464 A1* | 12/2014 | Singnurkar ........... G06F 3/0418 345/174 |
| 2015/0286332 A1 | 10/2015 | Hotelling et al. |
| 2017/0192582 A1* | 7/2017 | Pan ...................... G06F 3/0416 |

FOREIGN PATENT DOCUMENTS

| | | |
|---|---|---|
| JP | 2011-28476 A | 2/2011 |
| JP | 2012-78924 A | 4/2012 |
| JP | 2012-178050 A | 9/2012 |
| JP | 2012-195010 A | 10/2012 |

\* cited by examiner

*Primary Examiner* — Joseph R Haley
(74) *Attorney, Agent, or Firm* — Michael Best & Friedrich

(57) ABSTRACT

A detection apparatus includes a first electrode, a second electrode provided at a position that does not overlap with the first electrode, a third electrode arranged facing the first electrode and the second electrode via a spacing, and a detector configured to apply a drive signal to the first electrode and detect an output signal appearing in the second electrode.

14 Claims, 25 Drawing Sheets

FIG.18A
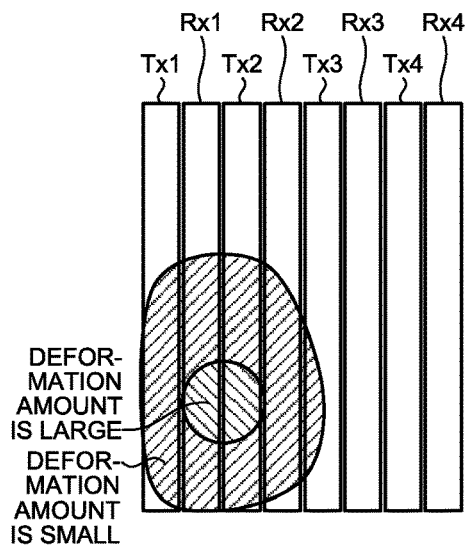
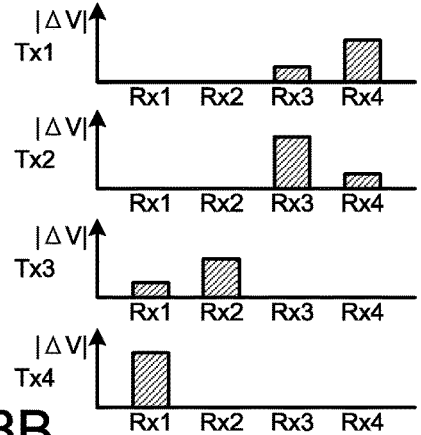
FIG.18B
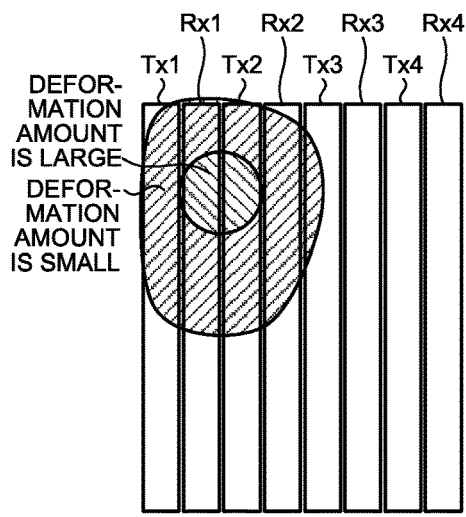
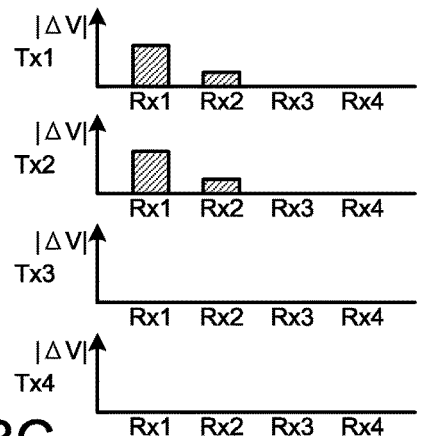
FIG.18C
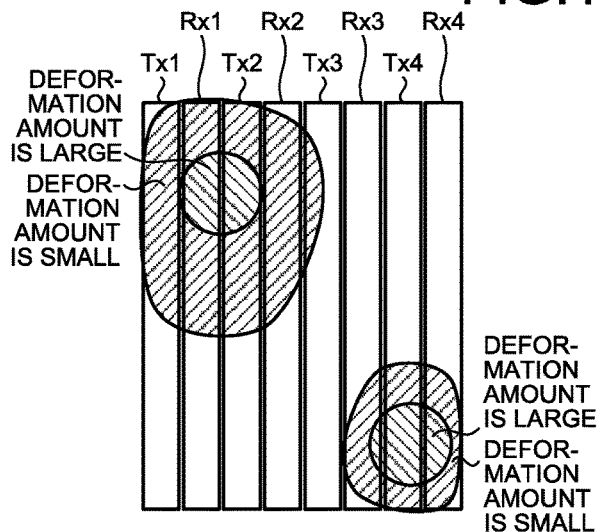
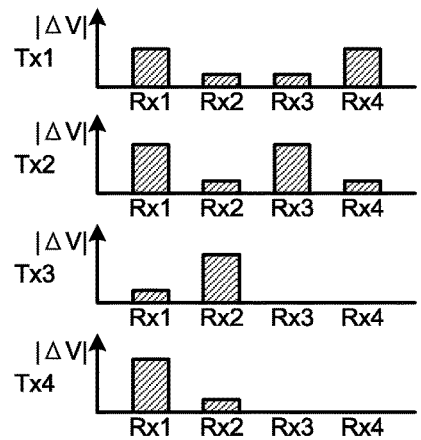

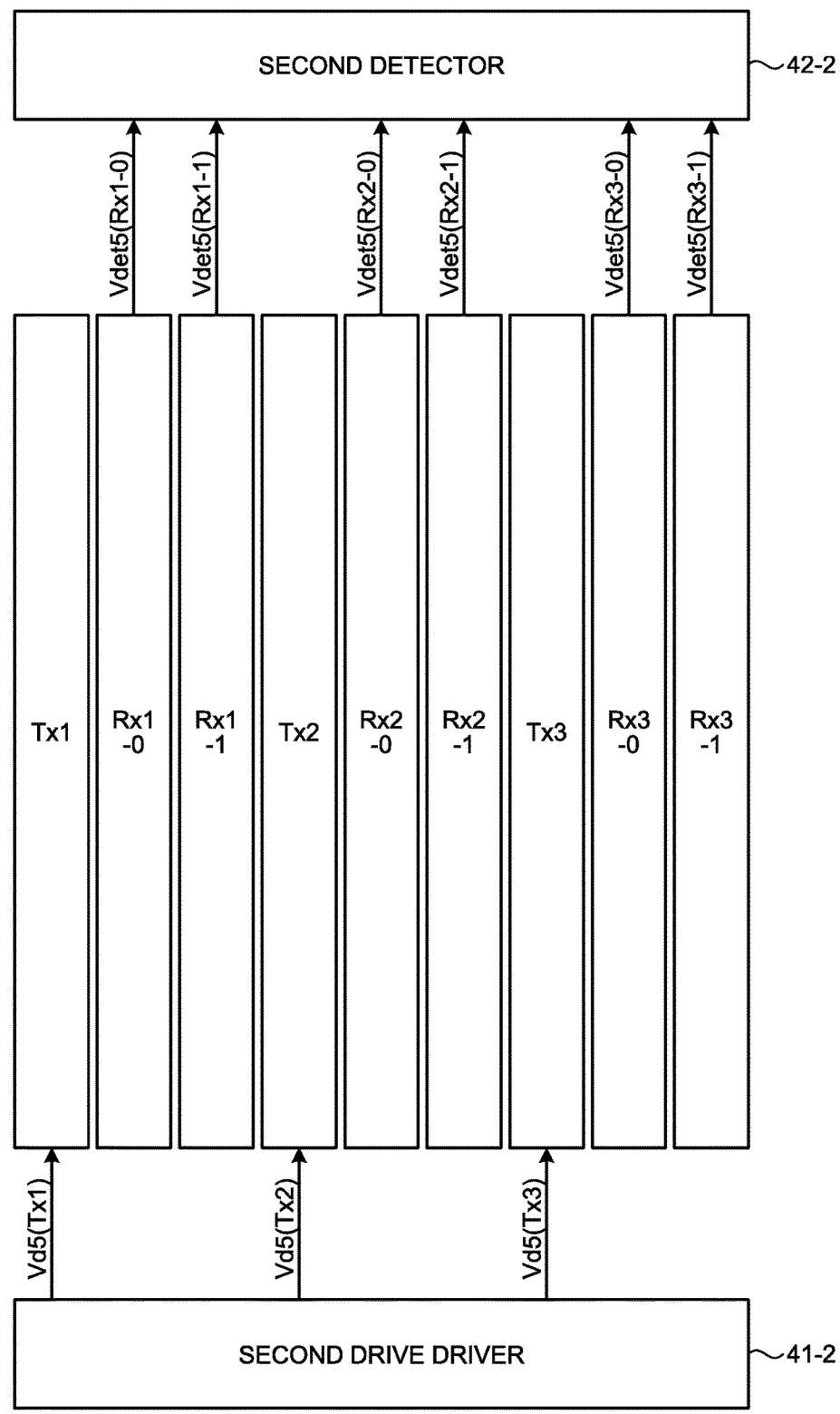

DETECTION APPARATUS AND TOUCH DETECTION FUNCTION-EQUIPPED DISPLAY APPARATUS

CROSS-REFERENCE TO RELATED APPLICATIONS

This application claims priority from Japanese Application No. 2016-154993, filed on Aug. 5, 2016, the contents of which are incorporated by reference herein in its entirety.

BACKGROUND

1. Technical Field

The present invention relates to a detection apparatus and a touch detection function-equipped display apparatus.

2. Description of the Related Art

In recent years, a touch detection apparatus that can detect an external close object what is called a touch panel is receiving attention. The touch panel is mounted on or integral with a display apparatus such as a liquid crystal display apparatus and is used as a touch detection function-equipped display apparatus. One including a capacitance type touch sensor is known as the touch detection function-equipped display apparatus.

As an additional function of the touch detection function-equipped display apparatus including the capacitance type touch sensor, disclosed is a configuration with an additional function that detects a force when a touch operation on the touch panel has been performed by a finger or a stylus, for example, by converting it into an electric signal (Japanese Patent Application Laid-open Publication No. 2012-195010 A, for example).

The capacitance type touch sensor includes a case in which transmission electrodes and reception electrodes are orthogonally arranged to perform touch position detection processing by a mutual capacitance type of the transmission electrodes and the reception electrodes and a case in which the touch position detection processing is performed by a self-capacitance type of both of the electrodes that are orthogonally arranged. The touch position detection processing can also be performed using both the mutual capacitance type and the self-capacitance type to improve the accuracy of detecting a touch operation position. In this configuration, when a force is attempted to be determined when the touch operation has been performed in addition to the touch position detection function, a technique other than the touch position detection technique of the mutual capacitance type or the self-capacitance type is required to be used. Examples of the technique for determining the force to the touch panel include using either of the electrodes for use in the touch position detection processing; in this case, although a force in an electrode arrangement direction can be determined, a force in an electrode extension direction cannot be determined. Consequently, the force at the detection position of the touch operation detected by the touch position detection processing cannot be appropriately calculated.

An object of the present invention is to provide a detection apparatus and a touch detection function-equipped display apparatus that can appropriately calculate a force at the detection position of a touch operation.

SUMMARY

According to one aspect, a detection apparatus includes at least one first electrode, at least one second electrode provided at a position that does not overlap with the at least one first electrode, a third electrode arranged facing the at least one first electrode and the at least one second electrode via a spacing, and a detector configured to apply a drive signal to the at least one first electrode and detect an output signal appearing in the at least one second electrode.

BRIEF DESCRIPTION OF THE DRAWINGS

FIGS. 18A, 18B, and 18C are diagrams of examples of the detection value in the arrangement pattern of the electrodes illustrated in FIG. 16;

FIG. 19 is a diagram of an example of an electric coupling state of the first electrode and the second electrode and the detector during force calculation processing by the touch detection function-equipped display apparatus according to a third modification of the first embodiment;

DETAILED DESCRIPTION

The following describes forms for performing the invention in detail with reference to the accompanying drawings. The details described in the following embodiments do not limit the present invention. Components described below include ones that those skilled in the art can easily think of and substantially the same ones. Further, the components described below can be combined as appropriate. The disclosure is only by way of example, and some appropriate modifications that can be easily thought of with the gist of the invention maintained by those skilled in the art are naturally included in the scope of the present invention. The drawings may schematically represent the width, thickness, shape, and the like of parts compared with actual forms in order to further clarify the description; they are only by way of example and do not limit the interpretation of the present invention. In the present specification and the drawings, components similar to those previously described in relation to the drawings previously described are denoted by the same symbols, and detailed descriptions thereof may be omitted as appropriate.

EMBODIMENT

Figure 1:
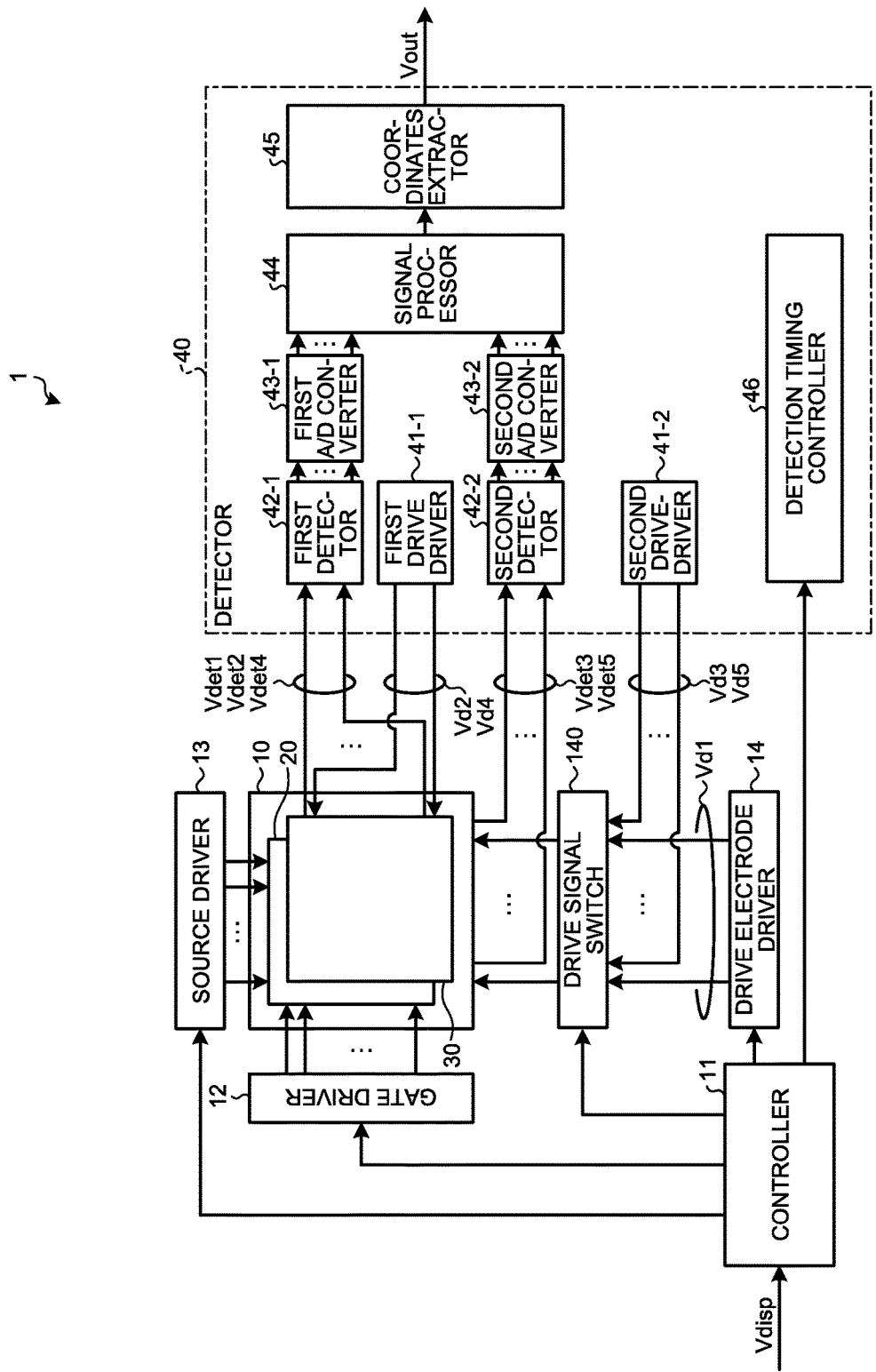
FIG. 1 is a block diagram of a configuration example of a touch detection function-equipped display apparatus according to an embodiment.

FIG. 1 is a block diagram of a configuration example of a touch detection function-equipped display apparatus according to an embodiment. This touch detection function-equipped display apparatus 1 includes a touch detection function-equipped display device 10, a controller 11, a gate driver 12, a source driver 13, a drive electrode driver 14, a drive signal switch 140, and a detector 40. The touch detection function-equipped display apparatus 1 is a display device in which the touch detection function-equipped display device 10 incorporates a touch detection function. In the present embodiment, the touch detection function-equipped display device 10 is an apparatus that integrates a display panel 20 and a touch panel 30 to which touch operations and forces by a finger or an object such as a stylus are applied.

The touch detection function-equipped display apparatus 1 according to the present embodiment includes a backlight (not illustrated) that irradiates the back face of the touch detection function-equipped display device 10 with light.

The touch detection function-equipped display apparatus 1 uses both a mutual capacitance type between detection electrodes TDL described below and drive electrodes COML described below and a self-capacitance type using the detection electrodes TDL and a self-capacitance type using the drive electrodes COML in combination to detect a touch operation or coordinates at which the touch operation has been performed. The details of this touch position detection technique will be described below. Touch position detection processing may use the mutual capacitance type alone or use the mutual capacitance type and the self-capacitance type in combination.

In the present embodiment, in the touch position detection processing using the mutual capacitance type between the detection electrodes TDL and the drive electrodes COML, the detection electrodes TDL are used for the detection of a touch operation and coordinates at which the touch operation has been performed, whereas the drive electrodes COML are used as drive electrodes in the touch position detection processing. The drive electrodes COML are used as common electrodes that give common potential to a plurality of pixel electrodes of the display panel 20 in image display processing. When both the self-capacitance type using the detection electrodes TDL and the self-capacitance type using the drive electrodes COML are used in combination to detect the coordinates at which the touch operation has been performed, the detection electrodes TDL are driven to detect a degree of the self-capacitance change of these detection electrodes TDL, thereby determining the coordinates of a touch detection position in the arrangement direction of the detection electrodes TDL, whereas the drive electrodes COML are driven to detect a degree of the self-capacitance change of these drive electrodes COML, thereby determining the coordinates of the touch detection position in the arrangement direction of the drive electrodes COML.

The touch detection function-equipped display apparatus 1 calculates a force to a display area 100 at the time of the touch operation using either the detection electrodes TDL or the drive electrodes COML. In the present embodiment, calculated is a relative level difference in a state in which the touch operation has been performed based on a state in which no touch operation has been performed. The details of this force calculation technique will be described below.

The touch detection function-equipped display apparatus 1 according to the present embodiment switches among a display period during which the image display processing is performed on the display panel 20, a touch position detection period during which the touch position detection processing is performed, and a force calculation period during which force calculation processing is performed within a period of one video frame to achieve the image display processing, the touch position detection processing, and the force calculation processing.

The gate driver 12 is a unit having a function of successively selecting one horizontal line as an object of the display drive of the touch detection function-equipped display device 10 based on a control signal supplied from the controller 11.

The source driver 13 is a unit that supplies a pixel signal Vpix to sub-pixels SPix described below of the touch detection function-equipped display device 10 based on a control signal supplied from the controller 11.

The drive electrode driver 14 is a unit that supplies a drive signal to the drive electrodes COML described below of the touch detection function-equipped display device 10 based on a control signal supplied from the controller 11 via the drive signal switch 140.

The display panel 20 successively scans each one horizontal line in accordance with a scan signal Vscan supplied from the gate driver 12 to perform display as described below.

The controller 11 is a unit that supplies the respective control signals to the gate driver 12, the source driver 13, the drive electrode driver 14, and the detector 40 based on an externally supplied video signal Vdisp to perform control to cause these units to operate in sync with each other.

The touch panel 30 operates based on the basic principles of a capacitance type touch position detection technique and a force calculation technique described below.

When the touch position detection processing is performed by the mutual capacitance type between the detection electrodes TDL and the drive electrodes COML (hereinafter, also referred to as "first touch position detection processing"), a first drive signal Vd1 is input from the drive electrode driver 14 via the drive signal switch 140 to the touch panel 30, which outputs a first detection signal Vdet1 to a first detector 42-1.

When the touch position detection processing is performed by the self-capacitance type using the detection electrodes TDL (hereinafter, also referred to as "second touch position detection processing"), a second drive signal Vd2 is input from a first drive driver 41-1 of the detector 40 to the touch panel 30, which outputs a second detection signal Vdet2 to the first detector 42-1.

When the touch position detection processing is performed by the self-capacitance type using the drive electrodes COML (hereinafter, also referred to as "third touch position detection processing"), a third drive signal Vd3 is input from a second drive driver 41-2 of the detector 40 via the drive signal switch 140 to the touch panel 30, which outputs a third detection signal Vdet3 to a second detector 42-2.

When the force to the display area 100 is determined using the detection electrodes TDL (hereinafter, also referred to as "first force calculation processing"), a fourth drive signal Vd4 is input from the first drive driver 41-1 of the detector 40 to the touch panel 30, which outputs a fourth detection signal Vdet4 to the first detector 42-1.

When the force to the display area 100 is determined using the drive electrodes COML (hereinafter, also referred to as "second force calculation processing"), a fifth drive signal Vd5 is input from the second drive driver 41-2 of the detector 40 via the drive signal switch 140 to the touch panel 30, which outputs a fifth detection signal Vdet5 to the second detector 42-2.

The detector 40 is a unit that performs the first touch position detection processing, the second touch position detection processing, or the third touch position detection processing based on the control signal supplied from the controller 11, the first detection signal Vdet1, the second detection signal Vdet2, or the third detection signal Vdet3 supplied from the touch panel 30 and performs the first force calculation processing or the second force calculation processing based on the control signal supplied from the controller 11 and the fourth detection signal Vdet4 or the fifth detection signal Vdet5 supplied from the touch panel 30. More specifically, the detector 40 performs the first touch position detection processing based on the first detection signal Vdet1 supplied from the touch panel 30. The detector 40 performs the second touch position detection processing based on the second detection signal Vdet2 supplied from the touch panel 30. The detector 40 performs the third touch position detection processing based on the third detection signal Vdet3 supplied from the touch panel 30. The detector 40 performs the first force calculation processing based on the fourth detection signal Vdet4 supplied from the touch panel 30. The detector 40 performs the second force calculation processing based on the fifth detection signal Vdet5 supplied from the touch panel 30.

The detector 40 includes the first drive driver 41-1, the first detector 42-1, a first A/D converter 43-1, the second drive driver 41-2, the second detector 42-2, a second A/D converter 43-2, a signal processor 44, a coordinates extractor 45, and a detection timing controller 46.

The controller 11 is a unit that supplies the respective control signals to the gate driver 12, the source driver 13, the drive electrode driver 14, and the detection timing controller 46 of the detector 40 based on the externally supplied video signal Vdisp to perform control to cause these units to operate in sync with each other.

This controller 11 has a clock generator (not illustrated) that generates a reference clock. The controller 11 generates the respective control signals to be supplied to the gate driver 12, the source driver 13, the drive electrode driver 14, and the detection timing controller 46 of the detector 40 based on the reference clock generated by the clock generator.

The first drive driver 41-1 supplies the second drive signal Vd2 or the fourth drive signal Vd4 to the detection electrodes TDL described below of the touch panel 30 illustrated in FIG. 1. In accordance with the second drive signal Vd2 or the fourth drive signal Vd4, electric charges are supplied to the detection electrodes TDL.

The second drive driver 41-2 supplies the third drive signal Vd3 or the fifth drive signal Vd5 to the drive electrodes COML described below of the touch panel 30 illustrated in FIG. 1. In accordance with the third drive signal Vd3 or the fifth drive signal Vd5, electric charges are supplied to the drive electrodes COML.

The first detector 42-1 amplifies the first detection signal Vdet1, the second detection signal Vdet2, and the fourth detection signal Vdet4 supplied from the detection electrodes TDL described below of the touch panel 30 illustrated in FIG. 1. The first detector 42-1 may include an analog low pass filter (LPF) as a low pass analog filter that removes high frequency components (noise components) contained in the first detection signal Vdet1, the second detection signal Vdet2, and the fourth detection signal Vdet4 and outputs these detection signals.

The first A/D converter 43-1 A/D converts analog signals output from the first detector 42-1 and outputs the converted signals to the signal processor 44.

The second detector 42-2 amplifies the third detection signal Vdet3 and the fifth detection signal Vdet5 supplied from the drive electrodes COML described below of the touch panel 30 illustrated in FIG. 1. The second detector 42-2 may include an analog low pass filter (LPF) as a low pass analog filter that removes high frequency components (noise components) contained in the third detection signal Vdet3 and the fifth detection signal Vdet5 and outputs these detection signals.

The second A/D converter 43-2 A/D converts analog signals output from the second detector 42-2 and outputs the converted signals to the signal processor 44.

The signal processor 44 is a unit that performs the first touch position detection processing, the second touch position detection processing, the third touch position detection processing, the first force calculation processing, or the second force calculation processing based on the output signals of the first A/D converter 43-1 and the second A/D converter 43-2.

The coordinates extractor 45 is a unit that extracts coordinates at which a touch operation has been performed on the touch panel 30 and a force at the coordinates based on the processing result of the signal processor 44.

Figure 2:
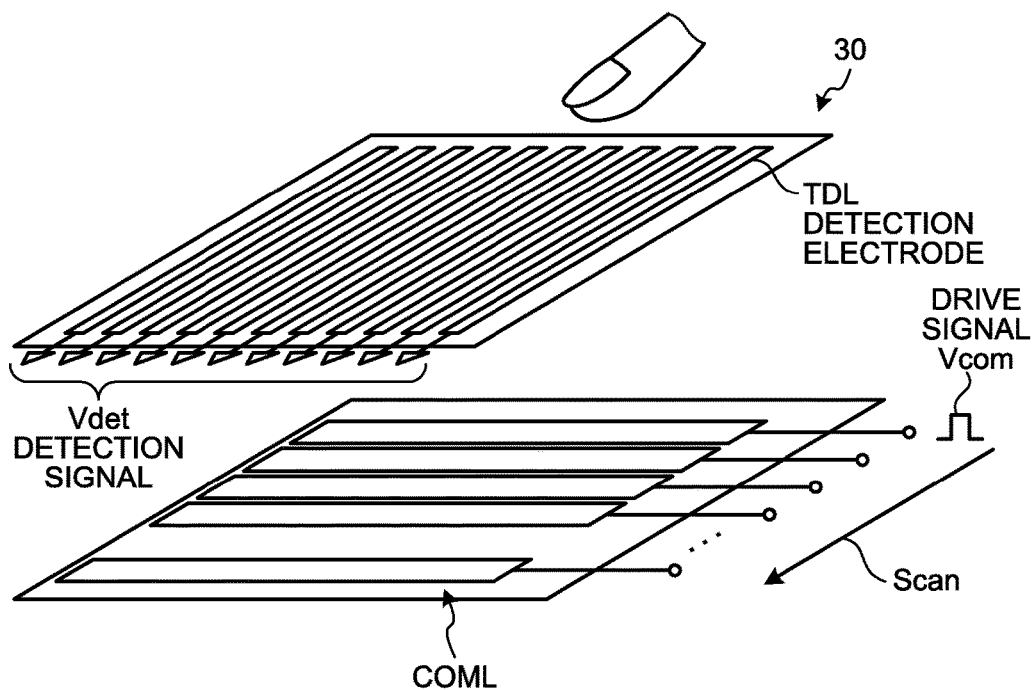
FIG. 2 perspectively represents the positional relation between drive electrodes and detection electrodes.

FIG. 2 perspectively represents the positional relation between drive electrodes and detection electrodes. The drive electrodes COML include a plurality of stripe-shaped electrode patterns extending in one direction. When the first touch position detection processing is performed by the mutual capacitance type between the detection electrodes TDL and the drive electrodes COML, the first drive signal Vd1 is successively supplied to the respective electrode patterns from the drive electrode driver 14 via the drive signal switch 140, and scan drive is successively performed in a time-division manner. The detection electrodes TDL include stripe-shaped electrode patterns extending in a direction crossing the extension direction of the electrode patterns of the drive electrodes COML. The detection electrodes TDL are provided facing the drive electrodes COML in a direction perpendicular to a plane on which the drive electrodes COML are provided. The electrode patterns of the drive electrodes COML and the detection electrodes TDL crossing each other generate capacitances at their cross parts.

As described above, the touch panel 30 operates based on the basic principles of the capacitance type touch position detection technique and the force calculation technique. The following describes the basic principle of the force calculation technique with reference to FIG. 3 to FIG. 6. The following omits a detailed description of the basic principle of the capacitance type touch position detection technique when the first touch position detection processing, the second touch position detection processing, and the third touch position detection processing are performed; in the first touch position detection processing, the detector 40 performs the first touch position detection processing by the mutual capacitance type between the drive electrodes COML and the detection electrodes TDL; in the second touch position detection processing, the detector 40 performs the second touch position detection processing by the self-capacitance type of the detection electrodes TDL; and in the third touch position detection processing, the detector 40 performs the second touch position detection processing by the self-capacitance type of the detection electrodes TDL.

Figure 3:
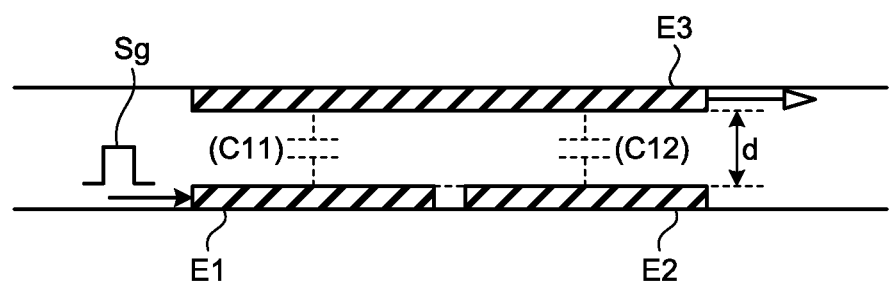
FIG. 3 is an illustrative diagram for illustrating the basic principle of a force calculation technique representing a state in which no force is applied to a touch panel.
Figure 4:
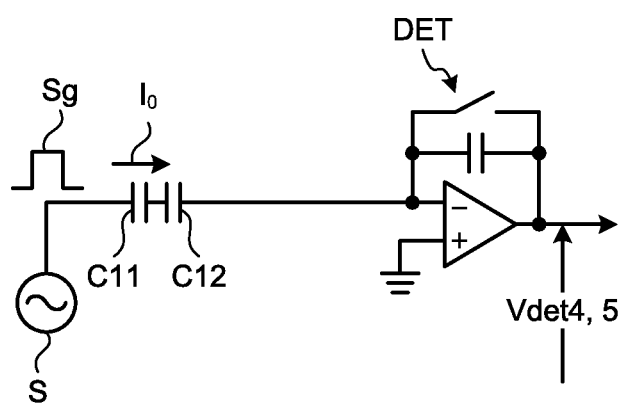
FIG. 4 is an illustrative diagram of an example of an equivalent circuit in a state in which no force is applied to the touch panel illustrated in FIG. 3.
Figure 5:
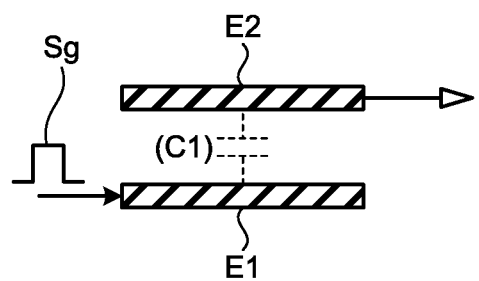
FIG. 5 is an illustrative diagram of an equivalent circuit of a series circuit illustrated in FIG. 3.
Figure 6:
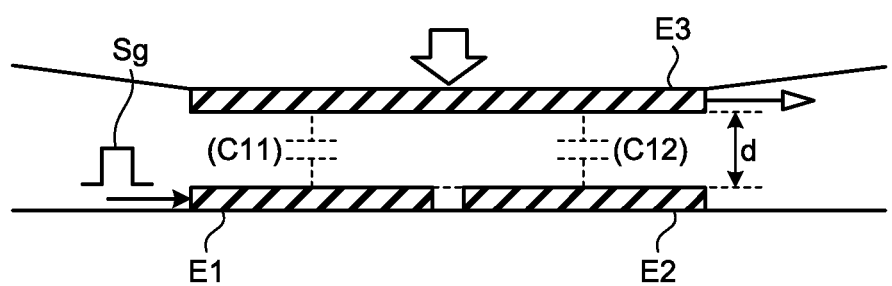
FIG. 6 is an illustrative diagram for illustrating the basic principle of the force calculation technique representing a state in which a force is being applied to the touch panel.

FIG. 3 is an illustrative diagram for illustrating the basic principle of the force calculation technique representing a state in which no force is applied to a touch panel. FIG. 4 is an illustrative diagram of an example of an equivalent circuit in a state in which no force is applied to the touch panel illustrated in FIG. 3. FIG. 5 is an illustrative diagram of an equivalent circuit of a series circuit illustrated in FIG. 3. FIG. 6 is an illustrative diagram for illustrating the basic principle of the force calculation technique representing a state in which a force is being applied to the touch panel.

As illustrated in FIG. 3, for example, a first electrode E1 and a second electrode E2 are provided on the same plane, whereas a third electrode (a floating electrode) E3 is arranged facing the first electrode E1 and the second electrode E2 via a spacing d astride the first electrode E1 and the second electrode E2. A first capacitance element C11 is formed in between the first electrode E1 and the third electrode E3 arranged facing each other across the spacing d, whereas a second capacitance element C12 is formed in between the second electrode E2 and the third electrode E3 arranged facing each other across the spacing d.

As illustrated in FIG. 4, one end of the first capacitance element C11 is coupled to an AC signal source (a drive signal source) S, whereas the other end thereof is coupled to one end of the second capacitance element C12. The other end of the second capacitance element C12 is coupled to a voltage detector DET. The voltage detector DET is an integrating circuit included in the first detector 42-1 or the second detector 42-2 illustrated in FIG. 1, for example.

The first capacitance element C11 and the second capacitance element C12 illustrated in FIG. 3 are coupled in series between the AC signal source (the drive signal source) S and the voltage detector DET to form a combined capacitance element. As illustrated in FIG. 5, this combined capacitance element can be regarded as a capacitance element C1 provided in between the first electrode E1 and the second electrode E2.

As illustrated in FIG. 6, when the spacing d between the first electrode E1 and the second electrode E2 and the third electrode E3 changes, the capacitance of the combined capacitance element C1 changes, and a voltage difference between a waveform $V_0$ and a waveform $V_1$ obtained by the voltage detector DET occurs. An absolute value $|\Delta V|$ of the voltage difference between the waveform $V_0$ and the waveform $V_1$ changes in accordance with the force to the display area 100. In other words, the absolute value $|\Delta V|$ of the voltage difference between the waveform $V_0$ and the waveform $V_1$, that is, a change in an output signal along with a change in the capacitance of the combined capacitance element C1 is detected, whereby a change level of the spacing d between the first electrode E1 and the second electrode E2 and the third electrode E3 can be determined. In the following description, the absolute value $|\Delta V|$ of the difference between the waveform $V_0$ and the waveform $V_1$ determined by the signal processor 44 is also referred to simply as a "detection value $|\Delta V|$" in the detector 40.

First Embodiment

Figure 7:
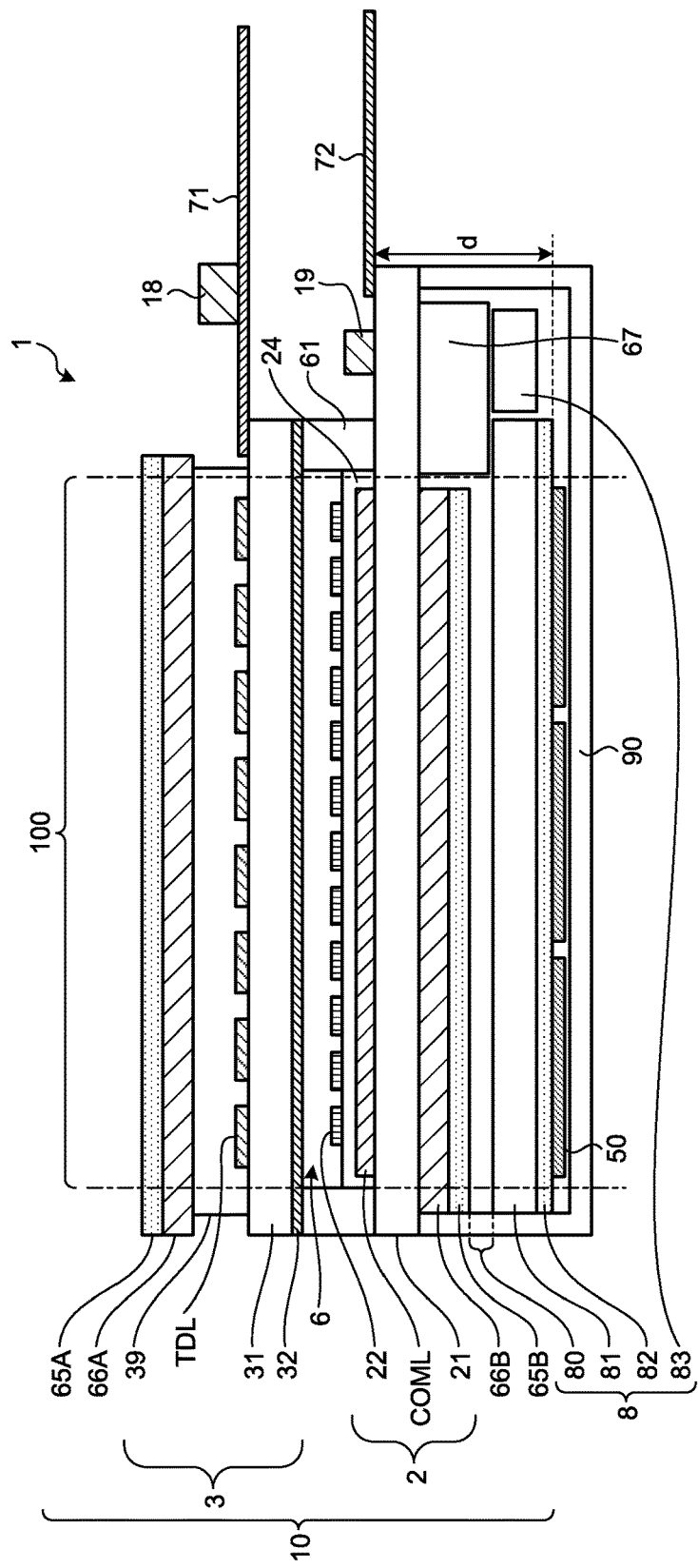
FIG. 7 is a sectional view of a schematic sectional structure of the touch detection function-equipped display apparatus according to a first embodiment.
Figure 8:
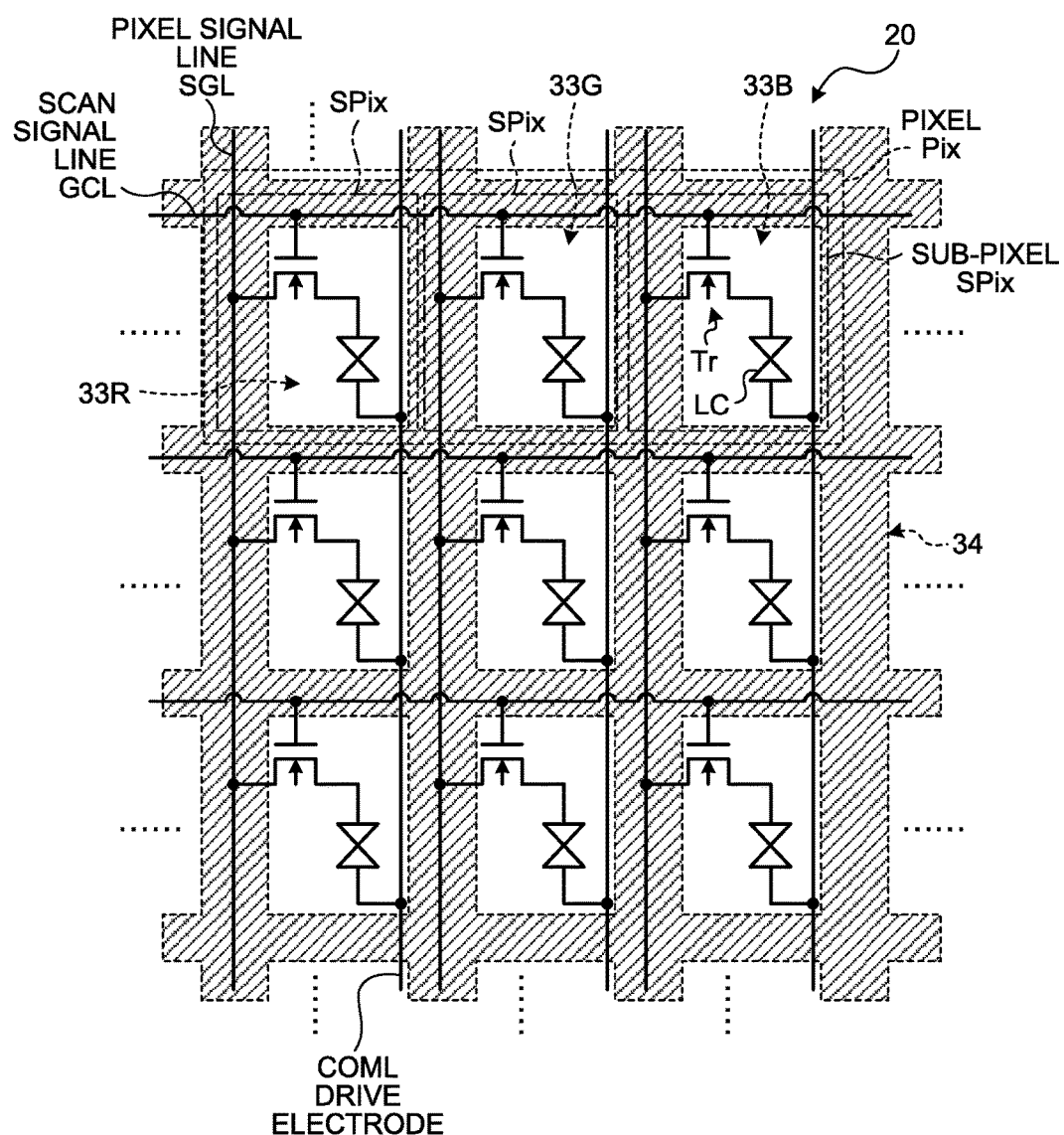
FIG. 8 is a circuit diagram of pixel arrangement of the touch detection function-equipped display apparatus according to the first embodiment.
Figure 9:
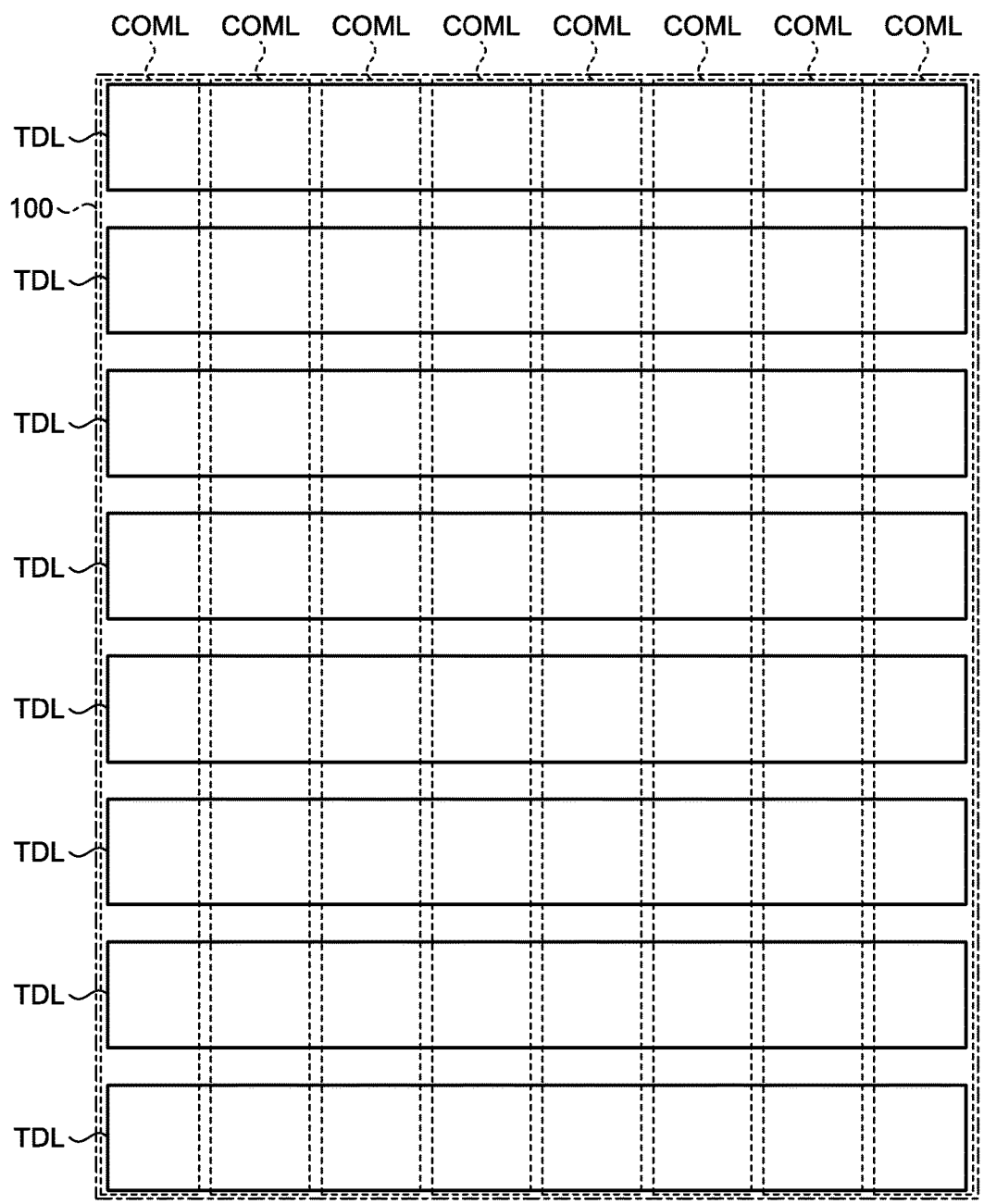
FIG. 9 is a plan view of an arrangement example of the drive electrodes and the detection electrodes of the touch detection function-equipped display apparatus according to the first embodiment when viewed in a direction perpendicular to a touch panel surface.

The following describes a configuration example of the touch detection function-equipped display apparatus 1 according to a first embodiment in detail. FIG. 7 is a sectional view of a schematic sectional structure of the touch detection function-equipped display apparatus according to the first embodiment. FIG. 8 is a circuit diagram of pixel arrangement of the touch detection function-equipped display apparatus according to the first embodiment. FIG. 9 is a plan view of an arrangement example of the drive electrodes and the detection electrodes of the touch detection function-equipped display apparatus according to the first embodiment when viewed in a direction perpendicular to a touch panel surface. Although the example illustrated in FIG. 9 illustrates an example in which eight detection electrodes TDL are orthogonal to eight drive electrodes COML, the number of the detection electrodes TDL and the number of the drive electrodes COML are not limited to this example.

As illustrated in FIG. 7, the touch detection function-equipped display apparatus 1 according to the first embodiment includes a pixel substrate 2, a counter substrate 3 arranged facing this pixel substrate 2 in a direction perpendicular to the surface of the pixel substrate 2, a liquid crystal layer 6 as a display function layer disposed in between the pixel substrate 2 and the counter substrate 3, and a backlight apparatus 8. The first embodiment will be described on the assumption that the touch detection function-equipped display device 10 includes units including the pixel substrate 2, the counter substrate 3, and the liquid crystal layer 6 except the backlight apparatus 8.

As illustrated in FIG. 7 and FIG. 9, the touch detection function-equipped display apparatus 1 has the display area 100 for displaying images. The display area 100 is an area in which images are displayed and is a rectangular area having two long sides and short sides facing each other. In the following description, a face of the touch detection function-equipped display device 10 on the counter substrate 3 side is also referred to as an "image display face."

The pixel substrate 2 includes a first substrate 21 as a circuit board, pixel electrodes 22, the drive electrodes COML, and an insulating layer 24. Thin film transistors (TFTs) as switching elements are arranged corresponding to the pixel electrodes 22 on the first substrate 21. The pixel electrodes 22 are provided above the first substrate 21, that is, on the image display face side of the touch detection function-equipped display device 10 and are arranged in a matrix (row-column configuration), in a plan view. The drive electrodes COML are provided in between the first substrate 21 and the pixel electrodes 22. The insulating layer 24 insulates the pixel electrodes 22 and the drive electrodes COML from each other. A polarizing plate 65B is provided on the underside of the first substrate 21 via an adhesive layer 66B.

An IC 19 for display control is provided on the first substrate 21. A flexible board 72 is coupled to an end of the first substrate 21. The IC 19 for display control is a chip that is chip on glass (COG)-mounted on the first substrate 21 and incorporates the controller 11. The IC 19 for display control outputs a control signal to scan signal lines GCL, pixel signal lines SGL, and the like described below based on the video signal Vdisp (refer to FIG. 1) supplied from an external host IC (not illustrated).

The counter substrate 3 includes a second substrate 31 and a color filter 32 formed on one face of the second substrate 31. The detection electrodes TDL are provided on the other face of the second substrate 31. A protective layer 39 is provided on the detection electrodes TDL. Further, a polarizing plate 65A is provided above the detection electrodes TDL via an adhesive layer 66A. A flexible board 71 is coupled to the second substrate 31. An IC 18 for touch detection is mounted on the flexible board 71. The detector 40 illustrated in FIG. 1 is mounted on the IC 18 for touch detection. The color filter 32 may be arranged on the first substrate 21. The first substrate 21 and the second substrate 31 are glass substrates, for example.

The first substrate 21 and the second substrate 31 are arranged facing each other with a certain spacing provided via a seal 61. The liquid crystal layer 6 is provided in a space in between the first substrate 21 and the second substrate 31. The liquid crystal layer 6 modulates light passing therethrough in accordance with the state of an electric field; liquid crystals of the transverse electric field mode such as in-plane switching (IPS) including fringe field switching (FFS) are used, for example. An alignment film is arranged in between the liquid crystal layer 6 and the pixel substrate 2 and in between the liquid crystal layer 6 and the counter substrate 3 illustrated in FIG. 7.

Formed on the first substrate 21 are thin film transistor (TFT) elements Tr of the respective sub-pixels SPix included in a pixel Pix and wiring such as the pixel signal lines SGL that supply a pixel signal VPix to the respective pixel electrodes 22 and scan signal lines GCL that drive the respective TFT elements Tr illustrated in FIG. 8. The pixel signal lines SGL thus extend on a plane parallel to the surface of the first substrate 21 to supply the pixel signal VPix for displaying an image on the pixel. Each of the pixel electrodes 22 includes pixel areas 33R, 33G, and 33B, and the display area 100 includes a light shielding area 34 that overlaps with wiring patterns having light shielding effect such as the pixel signal lines SGL and the scan signal lines GCL to separate pixel areas 33 (33R, 33G, and 33B) from each other. The light shielding area 34 includes a light shielding film (a black matrix, for example) provided in the color filter 32, for example.

The display panel 20 illustrated in FIG. 8 has a plurality of sub-pixels SPix arranged in a matrix. Each of the sub-pixels SPix includes a TFT element Tr and a liquid crystal capacitance LC. The TFT element Tr includes a thin film transistor and includes an n-channel metal oxide semiconductor (MOS) type TFT in this example. The source of the TFT element Tr is coupled to each of the pixel signal lines SGL, the gate thereof is coupled to each of the scan signal lines GCL, and the drain thereof is coupled to one end of the liquid crystal capacitance LC. One end of the liquid crystal capacitance LC is coupled to the drain of the TFT element Tr, whereas the other end thereof is coupled to each of the drive electrodes COML.

Each of the sub-pixels SPix is coupled to another sub-pixel SPix belonging to the same row of the display panel 20 by each of the scan signal lines GCL. The scan signal lines GCL are coupled to the gate driver 12, and the scan signal Vscan is supplied thereto from the gate driver 12. Each of the sub-pixels SPix is coupled to another sub-pixel SPix belonging to the same column of the display panel 20 by each of the pixel signal lines SGL. The pixel signal lines SGL are coupled to the source driver 13 via a source signal switch 130, and the pixel signal Vpix is supplied thereto from the source driver 13. Further, each of the sub-pixels SPix is coupled to another sub-pixel SPix belonging to the same column of the display panel 20 by each of the drive electrodes COML. The drive electrodes COML are coupled to the drive electrode driver 14 via the drive signal switch 140, and a drive signal Vcom is supplied thereto from the drive electrode driver 14. In other words, in this example, a plurality of sub-pixels SPix belonging to the same one column share one drive electrode COML.

The gate driver 12 illustrated in FIG. 1 applies the scan signal Vscan to the gates of the TFT elements Tr of the sub-pixels SPix via each of the scan signal lines GCL illustrated in FIG. 8, whereby one line (the one horizontal line) among the sub-pixels SPix formed in a matrix, on the display panel 20 is successively selected as the object of display drive. The source driver 13 illustrated in FIG. 1 supplies the pixel signal Vpix to the respective sub-pixels SPix included in the one horizontal line successively selected by the gate driver 12 via each of the pixel signal lines SGL illustrated in FIG. 8. These sub-pixels SPix perform the display of the one horizontal line in accordance with the supplied pixel signal Vpix.

As illustrated in FIG. 7, the backlight apparatus 8 is arranged below the pixel substrate 2, that is, on a face of the touch detection function-equipped display device 10 opposite to the image display face side. The backlight apparatus 8 includes a backlight 81, a reflective film 82, and a light source (an LED, for example) 83. One face of the backlight apparatus 8 faces the pixel substrate 2 via a gap 80. Floating electrodes 50 are provided on the other face of the backlight apparatus 8. These floating electrodes 50 correspond to the third electrode E3 in FIG. 3 and FIG. 6. The backlight apparatus 8 is covered with the pixel substrate 2 and a case 90, and a spacer 67 is arranged so as not to cause light emitted from the light source 83 to directly leak toward the pixel substrate 2.

The drive electrodes COML are provided in the display area 100 of the first substrate 21. The drive electrodes COML extend in a direction along the long side of the display area 100 and are arranged in a direction along the short side of the display area 100. A conductive material having translucency such as an indium tin oxide (ITO) is used for the drive electrodes COML.

The detection electrodes TDL are provided in the display area 100 of the second substrate 31. The detection electrodes TDL extend in a direction along the short side of the display area 100 and are arranged in a direction along the long side of the display area 100.

Although the first embodiment has been described on the assumption that the detector 40 is mounted on the IC 18 for touch detection mounted on the flexible board 71, part of the functions of the detector 40 may be provided as the functions of another MPU. Specifically, some of various functions such as A/D conversion and noise removal that can be provided as the functions of the IC 18 for touch detection (noise removal, for example) may be mounted on a circuit such as a micro-processing unit (MPU) provided separately from the IC 18 for touch detection.

As described above, in the first embodiment, the detection electrodes TDL, the drive electrodes COML, and the floating electrodes 50 (the third electrode E3) are provided in this order from the image display face side of the touch detection function-equipped display device 10. The backlight apparatus 8 is provided apart from the touch detection function-equipped display device 10 via the gap 80. The floating electrodes 50 are provided on a face of the backlight apparatus 8 opposite to the image display face.

In the first embodiment, in the above configuration, the drive electrodes COML are caused to function as the first electrode E1 and the second electrode E2 illustrated in FIG. 3 and FIG. 6 to perform the second force calculation processing. In the configuration of the first embodiment illustrated in FIG. 7, the floating electrodes 50 correspond to the third electrode E3 illustrated in FIG. 3 and FIG. 6 as described above. In other words, the detection apparatus according to the first embodiment includes the first electrode E1 and the second electrode E2 by the drive electrodes COML, the third electrode E3 by the floating electrodes 50, and the second drive driver 41-2 and the second detector 42-2 in the detector 40.

In the configuration of the first embodiment illustrated in FIG. 7, the gap 80 is formed in between the pixel substrate 2 and the backlight apparatus 8, and in this state, the perimeter of the touch detection function-equipped display device 10 is supported by the case 90; consequently, the touch detection function-equipped display device 10 becomes deformed through a force to the display area 100 of the touch detection function-equipped display device 10, and the distance (spacing) d between the drive electrodes COML (the first electrode E1 and the second electrode E2) and the floating electrodes 50 (the third electrode E3) changes. The absolute value $|\Delta V|$ (refer to FIG. 7) of the voltage difference between the waveform $V_0$ and the waveform $V_1$ caused by the change in the distance (spacing) d between these drive electrodes COML (the first electrode E1 and the second electrode E2) and the floating electrodes 50 (the third electrode E3), that is, the change in the output signal along with the change in the capacitance of the combined capacitance element C1 including the first capacitance element C11 including the first electrode E1 and the third electrode E3 and the second capacitance element C12 including the second electrode E2 and the third electrode E3 that are coupled to each other in series is detected, whereby the force to the display area 100 can be determined.

Figure 10:
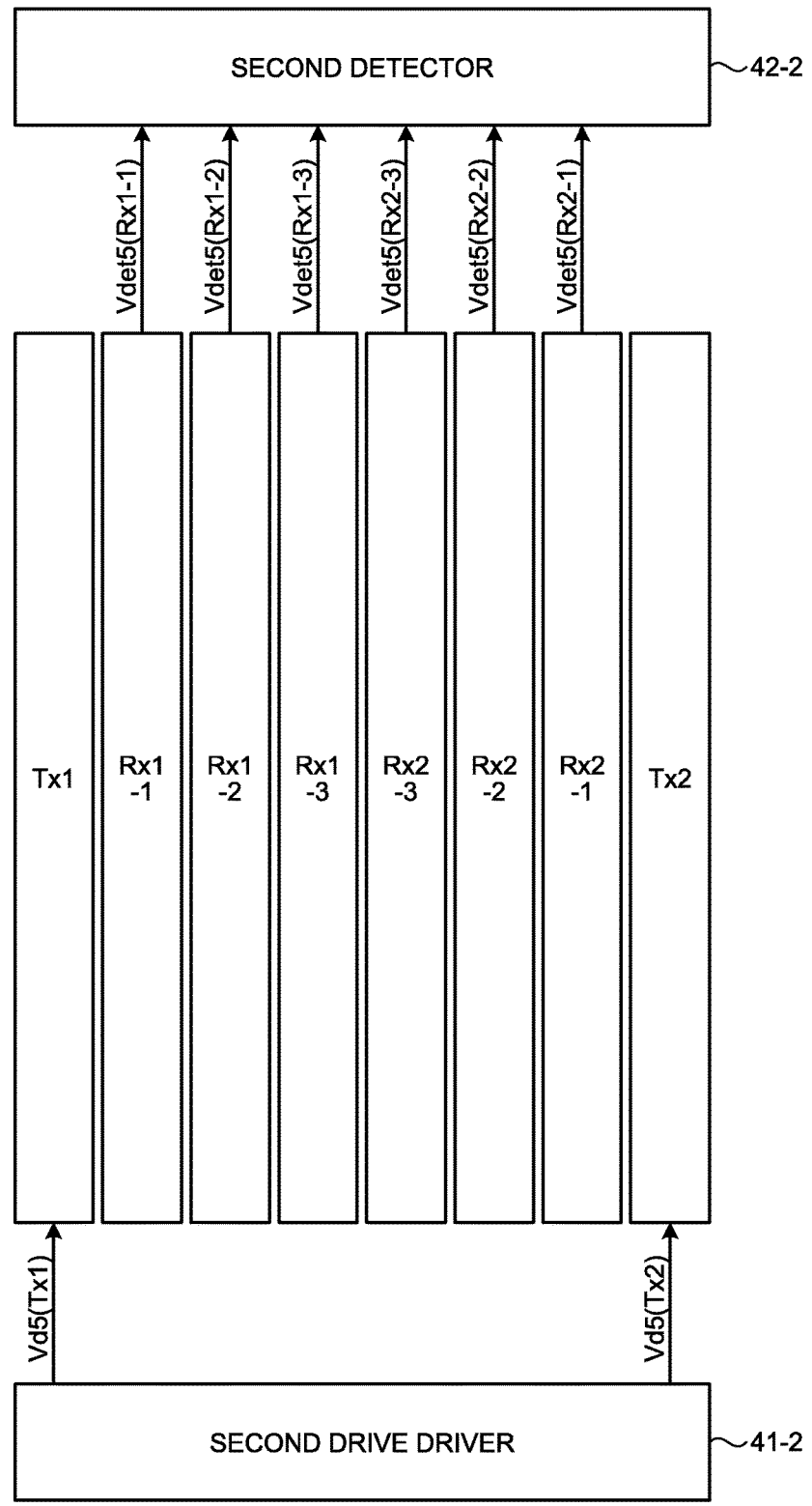
FIG. 10 is a diagram of an example of an electric coupling state of a first electrode and a second electrode and a detector during force calculation processing by the touch detection function-equipped display apparatus according to the first embodiment.

FIG. 10 is a diagram of an example of an electric coupling state of a first electrode and a second electrode and a detector during force calculation processing by the touch detection function-equipped display apparatus according to the first embodiment. FIG. 3 is a diagram of an example of an arrangement pattern of electrodes in the touch detection function-equipped display apparatus according to the first embodiment.

The example illustrated in FIG. 10 illustrates an example in which, among the eight drive electrodes COML illustrated in FIG. 9, the drive electrodes COML positioned at both ends of the arrangement direction of the drive electrodes COML are designated as the first electrode E1, whereas the other drive electrodes COML are designated as the second electrode E2, thus causing the drive electrodes COML to have respective roles during touch detection. In the following description, in the example illustrated in FIG. 10, the eight drive electrodes COML are referred to as a transmission electrode Tx1 as the first electrode E1; a reception electrode Rx1-1, a reception electrode Rx1-2, a reception electrode Rx1-3, a reception electrode Rx2-3, a reception electrode Rx2-2, and a reception electrode Rx2-1 as the second electrode E2; and a transmission electrode Tx2 as the first electrode E1 in order from the leftmost drive electrode COML.

The second drive driver 41-2 applies a fifth drive signal Vd5 (Tx1) to the transmission electrode Tx1, whereas the second drive driver 41-2 applies a fifth drive signal Vd5 (Tx2) to the transmission electrode Tx2. The example illustrated in FIG. 10 omits the drive signal switch 140.

The reception electrode Rx1-1 outputs a fifth detection signal Vdet5 (Rx1-1) to the second detector 42-2, the reception electrode Rx1-2 outputs a fifth detection signal Vdet5 (Rx1-2) to the second detector 42-2, the reception electrode Rx1-3 outputs a fifth detection signal Vdet5 (Rx1-3) to the second detector 42-2, the reception electrode Rx2-3 outputs a fifth detection signal Vdet5 (Rx2-3) to the second detector 42-2, the reception electrode Rx2-2 outputs a fifth detection signal Vdet5 (Rx2-2) to the second detector 42-2, and the reception electrode Rx2-1 outputs a fifth detection signal Vdet5 (Rx2-1) to the second detector 42-2.

Figure 11:
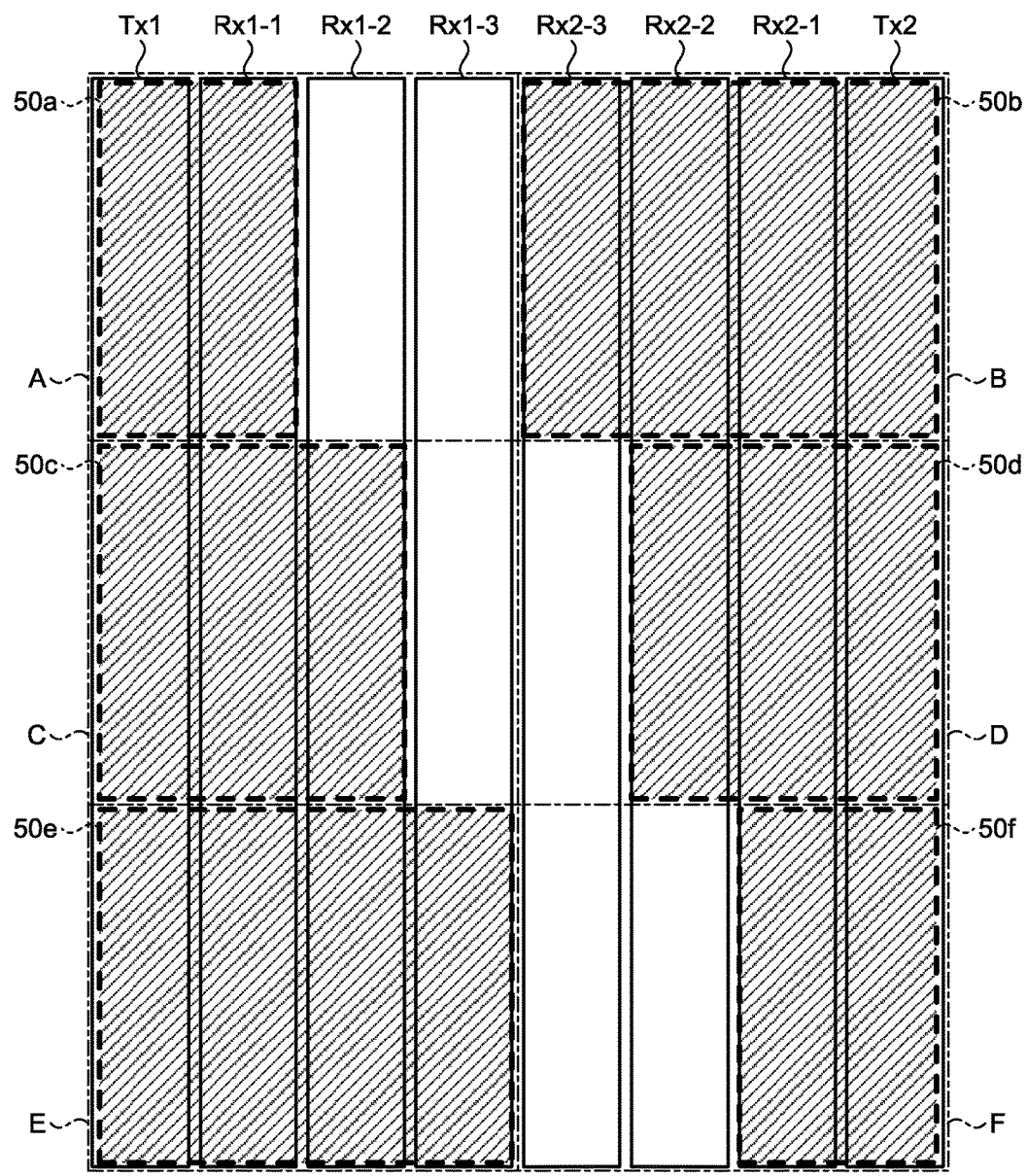
FIG. 11 is a diagram of an example of an arrangement pattern of electrodes in the touch detection function-equipped display apparatus according to the first embodiment.

The example illustrated in FIG. 11 illustrates an example of the arrangement pattern in which the third electrode E3 (floating electrodes 50a, 50b, 50c, 50d, 50e, and 50f) is arranged facing the first electrode E1 (the transmission electrodes Tx1 and Tx2) and the second electrode E2 (the reception electrodes Rx1-1, Rx1-2, Rx1-3, Rx2-3, Rx2-2, and Rx2-1). More specifically, a drive electrode COML formation area is divided into six areas including up-anddown three rows and right-and-left two columns; the floating electrode 50a is arranged astride the transmission electrode Tx1 and the reception electrode Rx1-1 in the upper-row, left area A in FIG. 11. The floating electrode 50b is arranged astride the transmission electrode Tx2 and the reception electrodes Rx2-1, Rx2-2, and Rx2-3 in the upper-row, right area B in FIG. 11. The floating electrode 50c is arranged astride the transmission electrode Tx1 and the reception electrodes Rx1-1 and Rx1-2 in the middle-row, left area C in FIG. 11. The floating electrode 50d is arranged astride the transmission electrode Tx2 and the reception electrodes Rx2-1 and Rx2-2 in the middle-row, right area D in FIG. 11. The floating electrode 50e is arranged astride the transmission electrode Tx1 and the reception electrodes Rx1-1, Rx1-2, and Rx1-3 in the lower-row, left area E in FIG. 11. The floating electrode 50f is arranged astride the transmission electrode Tx2 and the reception electrode Rx2-1 in the lower-row, right area F in FIG. 11. Although the example illustrated in FIG. 11 illustrates a mode in which no floating electrode is arranged in a part overlapping with the reception electrode Rx1-2 and the reception electrode Rx1-3 in the area A, a part overlapping with the reception electrode Rx1-3 in the area C, a part overlapping with the reception electrode Rx2-3 in the area D, and a part overlapping with the reception electrode Rx2-2 and the reception electrode Rx2-3 in the area F, the arrangement of the floating electrodes is not limited to this example and can employ the modes of first, second, and third modifications of the first embodiment and second and third embodiments below and other modes.

In the configuration illustrated in FIG. 10 and FIG. 11, there are six combinations forming the combined capacitance element C1 (refer to FIG. 5) via the third electrode E3 (the floating electrodes 50a, 50b, 50c, 50d, 50e, and 50f) when they are represented by (transmission electrode Txn; floating electrode; reception electrode Rxm):

(Tx1; floating electrode 50a; Rx1-1)
(Tx1; floating electrode 50c; Rx1-2)
(Tx1; floating electrode 50e; Rx1-3)
(Tx2; floating electrode 50b; Rx2-3)
(Tx2; floating electrode 50d; Rx2-2)
(Tx2; floating electrode 50f; Rx2-1)

In other words, the reception electrodes Rx1-1, Rx1-2, Rx1-3, Rx2-1, Rx2-2, and Rx2-3 form the combined capacitance element C1 together with either of the transmission electrodes Tx1 and Tx2.

In the configuration illustrated in FIG. 10 and FIG. 11, three reception electrodes Rx1-1, Rx1-2, and Rx1-3 (the second electrode E2) are arranged by the side of the transmission electrode Tx1 (the first electrode E1), whereas three reception electrodes Rx2-1, Rx2-2, and Rx2-3 (the second electrode E2) are arranged by the side of the transmission electrode Tx2 (the first electrode E1).

In the configuration illustrated in FIG. 10 and FIG. 11, the three reception electrodes Rx1-1, Rx1-2, and Rx1-3 (the second electrode E2) form the combined capacitance element C1 together with one transmission electrode Tx1 (the first electrode E1), whereas the three reception electrodes Rx2-1, Rx2-2, and Rx2-3 (the second electrode E2) form the combined capacitance element C1 together with one transmission electrode Tx2 (the first electrode E1). In other words, there is no reception electrode that forms the combined capacitance element C1 together with both the transmission electrodes Tx1 and Tx2. Consequently, in the configuration illustrated in FIG. 10 and FIG. 11, the fifth drive signals Vd5 (Tx1) and Vd5 (Tx2) can be simultaneously transmitted to the respective transmission electrodes Tx1 and Tx2 (the first electrode E1) to perform parallel processing.

When the second force calculation processing is performed in the configuration, in the touch panel 30 illustrated in FIG. 1, the fifth drive signal Vd5 (Tx1) is supplied to the transmission electrode Tx1 from the second drive driver 41-2, and in accordance with this fifth drive signal Vd5 (Tx1), electric charges are supplied to the transmission electrode Tx1. The fifth drive signal Vd5 (Tx2) is supplied to the transmission electrode Tx2 from the second drive driver 41-2, and in accordance with this fifth drive signal Vd5 (Tx2), electric charges are supplied to the transmission electrode Tx2.

The touch panel 30 outputs the fifth detection signal Vdet5 (Rx1-1) from the reception electrode Rx1-1, outputs the fifth detection signal Vdet5 (Rx1-2) from the reception electrode Rx1-2, outputs the fifth detection signal Vdet5 (Rx1-3) from the reception electrode Rx1-3, outputs the fifth detection signal Vdet5 (Rx2-1) from the reception electrode Rx2-1, outputs the fifth detection signal Vdet5 (Rx2-2) from the reception electrode Rx2-2, and outputs the fifth detection signal Vdet5 (Rx2-3) from the reception electrode Rx2-3. These fifth detection signals Vdet5 (Rx1-1), Vdet5 (Rx1-2), Vdet5 (Rx1-3), Vdet5 (Rx2-1), Vdet5 (Rx2-2), and Vdet5 (Rx2-3) are supplied to the second detector 42-2 of the detector 40.

The second detector 42-2 amplifies the fifth detection signals Vdet5 (Rx1-1), Vdet5 (Rx1-2), Vdet5 (Rx1-3), Vdet5 (Rx2-1), Vdet5 (Rx2-2), and Vdet5 (Rx2-3) supplied from the touch panel 30.

The second A/D converter 43-2 A/D converts signals input from the second detector 42-2 and outputs the converted signals to the signal processor 44.

The signal processor 44 performs processing to extract a detection signal difference caused by the force to the display area 100 for each of the reception electrodes Rx1-1, Rx1-2, Rx1-3, Rx2-1, Rx2-2, and Rx2-3. This detection signal difference is the absolute value $|\Delta V|$ of the difference between the waveform $V_0$ and the waveform $V_1$ in FIG. 7 as described above. The signal processor 44 may perform a calculation to average the absolute value $|\Delta V|$ for each of the reception electrodes Rx1-1, Rx1-2, Rx1-3, Rx2-1, Rx2-2, and Rx2-3 to determine the average of the absolute value $|\Delta V|$. With this processing, the signal processor 44 can reduce the influence of noise. The signal processor 44 can calculate forces at the respective areas A, B, C, D, E, and F using the absolute value $|\Delta V|$ of the difference between the waveform $V_0$ and the waveform $V_1$ obtained as described above, that is, the detection value $|\Delta V|$ as the change in the output signal along with the change in the capacitance of the combined capacitance element C1.

In the example illustrated in FIG. 3, when a force is applied to the area A, for example, the detection value $|\Delta V|$ in the reception electrode Rx1-1 is larger than the detection values $|\Delta V|$ in the other reception electrodes Rx1-2, Rx1-3, Rx2-1, Rx2-2, and Rx2-3.

When a force is applied to the area B illustrated in FIG. 11, for example, the detection values $|\Delta V|$ in the reception electrodes Rx2-1, Rx2-2, and Rx2-3 are larger than the detection values $|\Delta V|$ in the other reception electrodes Rx1-1, Rx1-2, and Rx1-3.

When a force is applied to the area C illustrated in FIG. 11, for example, the detection values $|\Delta V|$ in the reception electrodes Rx1-1 and Rx1-2 are larger than the detection values $|\Delta V|$ in the other reception electrodes Rx1-3, Rx2-1, Rx2-2, and Rx2-3.

When a force is applied to the area D illustrated in FIG. 11, for example, the detection values |ΔV| in the reception electrodes Rx2-1 and Rx2-2 are larger than the detection values |ΔV| in the other reception electrodes Rx1-1, Rx1-2, Rx1-3, and Rx2-3.

When a force is applied to the area E illustrated in FIG. 11, for example, the detection values |ΔV| in the reception electrodes Rx1-1, Rx1-2, and Rx1-3 are larger than the detection values |ΔV| in the other reception electrodes Rx2-1, Rx2-2, and Rx2-3.

When a force is applied to the area F illustrated in FIG. 11, for example, the detection value |ΔV| in the reception electrode Rx2-1 is larger than the detection values |ΔV| in the other reception electrodes Rx1-1, Rx1-2, Rx1-3, Rx2-2, and Rx2-3.

The display area 100 is thus divided into a plurality of areas, and the arrangement pattern of the floating electrodes 50 (the third electrode E3) is varied for each of the divided areas, whereby the force to the display area 100 can be calculated for each of the divided areas.

The above example illustrates an example in which the forces at the respective divided areas obtained by dividing the display area 100; the touch detection function-equipped display apparatus 1 according to the first embodiment can calculate a force at any position of the display area 100.

Figure 12A:
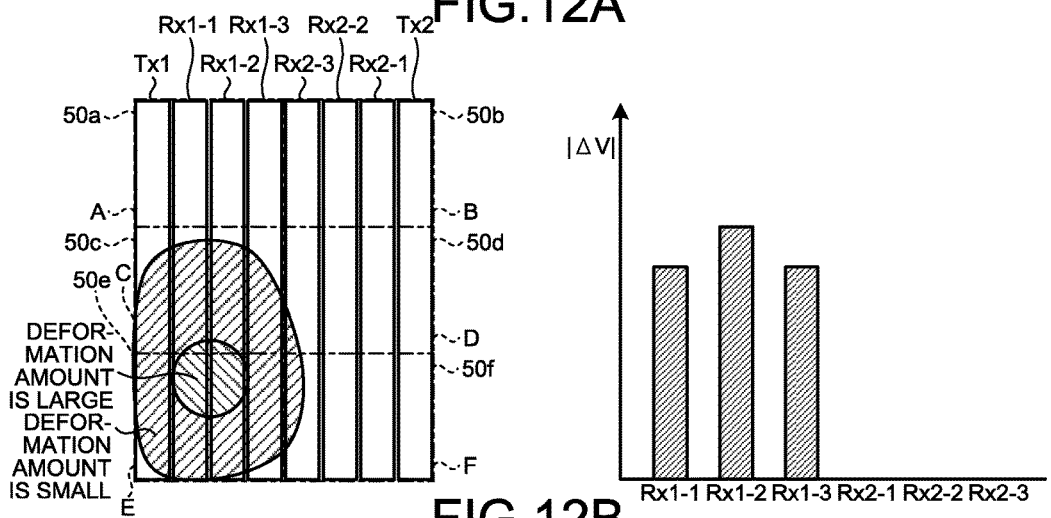
FIGS. 12A, 12B, and 12C are diagrams of examples of a detection value in the arrangement pattern of the electrodes illustrated in FIG. 11.
Figure 12B:
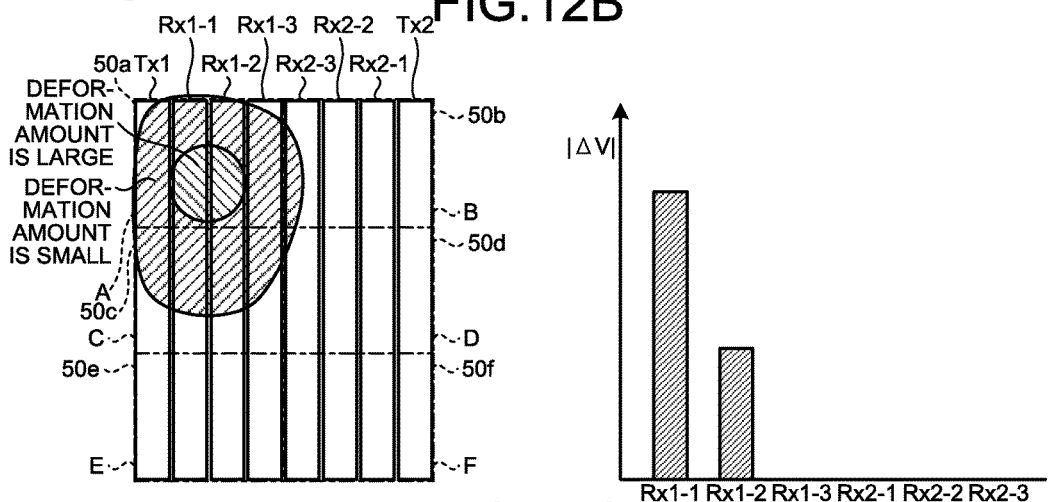
Figure 12C:
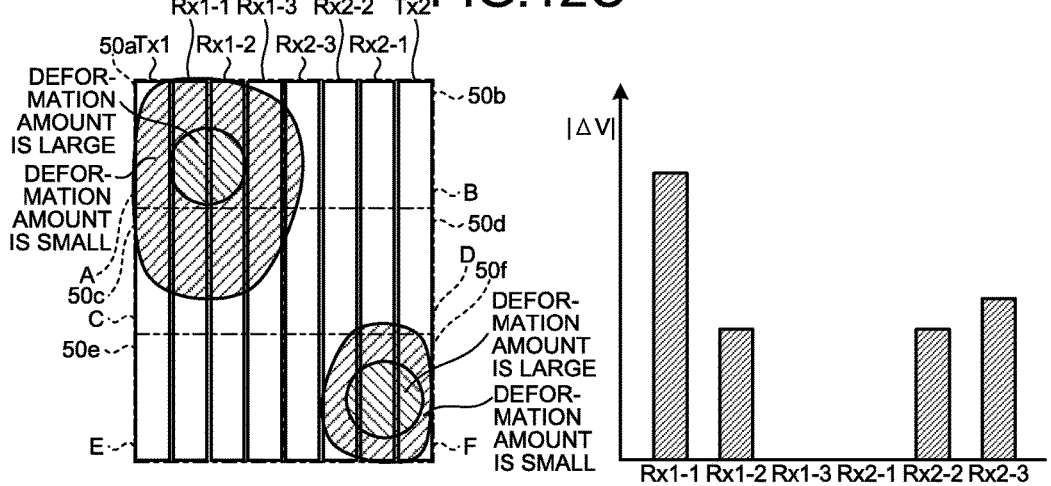

FIGS. 12A, 12B, and 12C are diagrams of examples of a detection value in the arrangement pattern of the electrodes illustrated in FIG. 11. As illustrated in FIGS. 12A, 12B, and 12C, for example, even when a force is applied to deform a plurality of areas of the touch detection function-equipped display device 10, the force at any position of the display area 100 can be calculated.

When the distribution of the deformation amount of the touch detection function-equipped display device 10 becomes a state illustrated in FIG. 12A as a result of the display area 100 being pressed, for example, the detection value |ΔV| in the reception electrode Rx1-2 is the largest value, and the detection values |ΔV| in the reception electrodes Rx1-1 and Rx1-3 adjacent to the reception electrode Rx1-2 are the next largest value following the detection value |ΔV| in the reception electrode Rx1-2.

When the distribution of the deformation amount of the touch detection function-equipped display device 10 becomes a state illustrated in FIG. 12B, for example, the detection value |ΔV| in the reception electrode Rx1-1 is the largest value, and the detection value |ΔV| in the reception electrode Rx1-2 adjacent to the reception electrode Rx1-1 is the next largest value following that in the reception electrode Rx1-1.

When the distribution of the deformation amount of the touch detection function-equipped display device 10 becomes a state illustrated by a plurality of areas as in FIG. 12C, for example, the detection value |ΔV| in the reception electrode Rx1-1 is the largest value, and the detection value |ΔV| in the reception electrode Rx2-3 is the next largest value following the detection value |ΔV| in the reception electrode Rx1-1.

The signal processor 44 appropriately analyzes the detection values |ΔV| in the respective reception electrodes Rx1-1, Rx1-2, Rx1-3, Rx2-1, Rx2-2, and Rx2-3, whereby even when a force is applied to deform a plurality of areas of the touch detection function-equipped display device 10, the force at any position of the display area 100 can be calculated as described above, and even when forces are applied to a plurality of places as illustrated in FIG. 12C, the forces at any positions of the display area 100 can be calculated.

Consequently, the signal processor 44 can appropriately calculate the force at the touch detection position detected by the first touch position detection processing, the second touch position detection processing, and the third touch position detection processing.

First Modification

Figure 13:
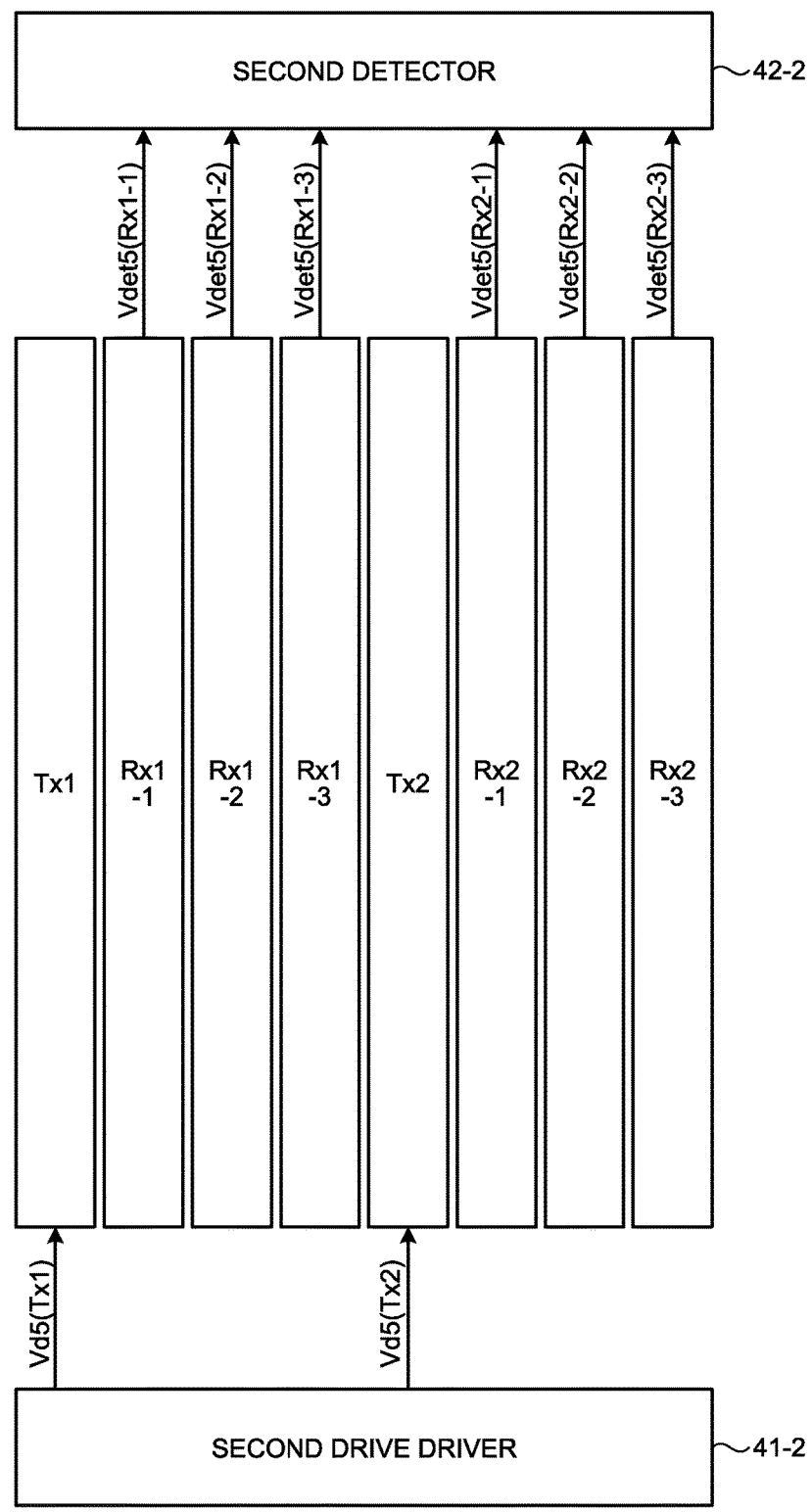
FIG. 13 is a diagram of an example of an electric coupling state of the first electrode and the second electrode and the detector during force calculation processing by the touch detection function-equipped display apparatus according to a first modification of the first embodiment.
Figure 14:
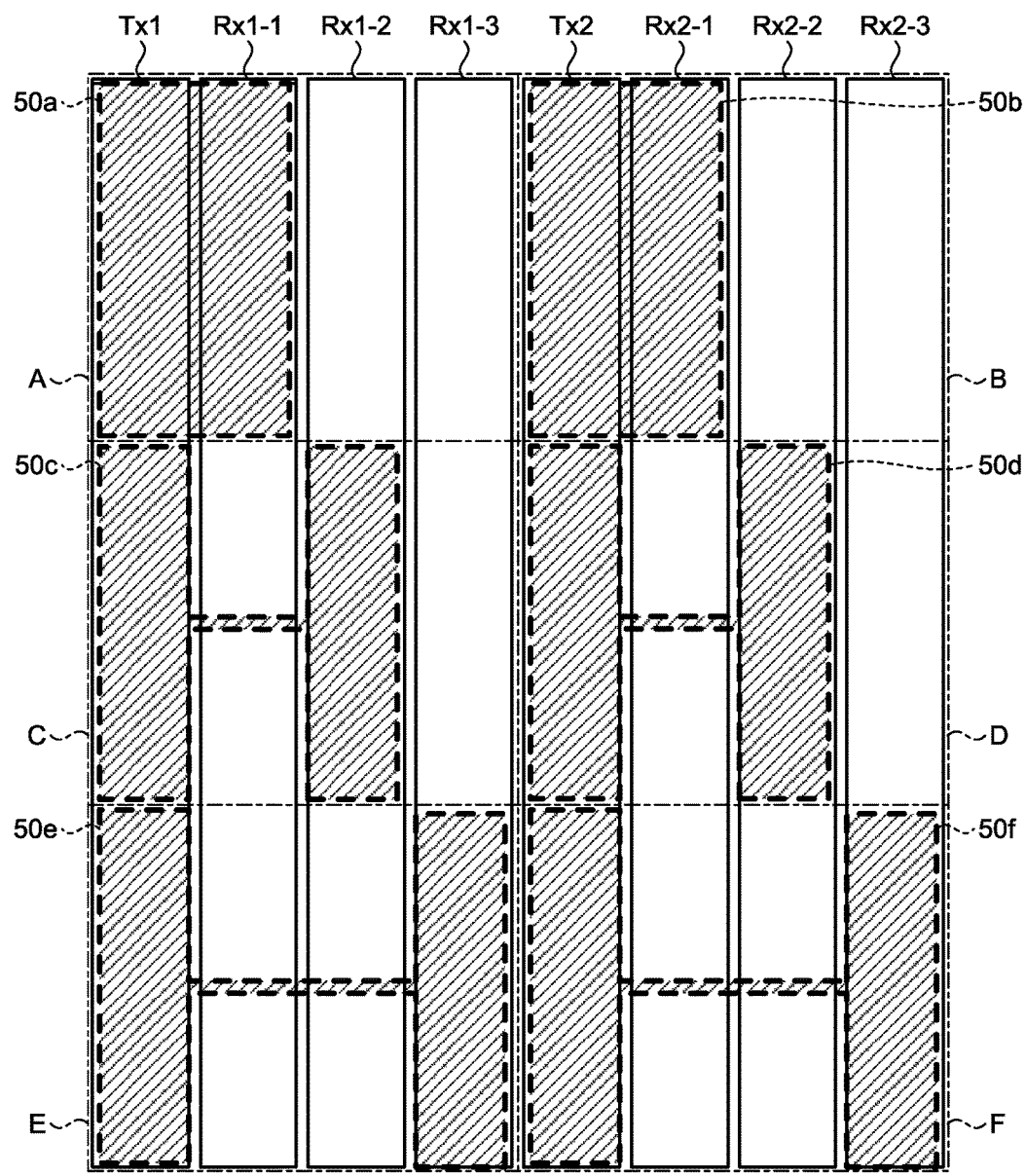
FIG. 14 is a diagram of an example of an arrangement pattern of electrodes in the touch detection function-equipped display apparatus according to the first modification of the first embodiment.
Figure 15A:
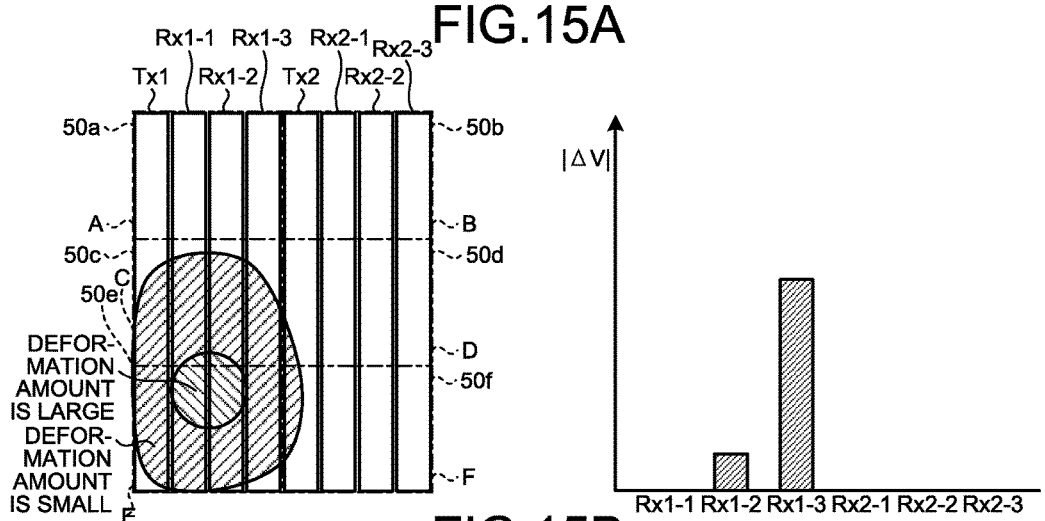
FIGS. 15A, 15B, and 15C are diagrams of examples of the detection value in the arrangement pattern of the electrodes illustrated in FIG. 14.
Figure 15B:
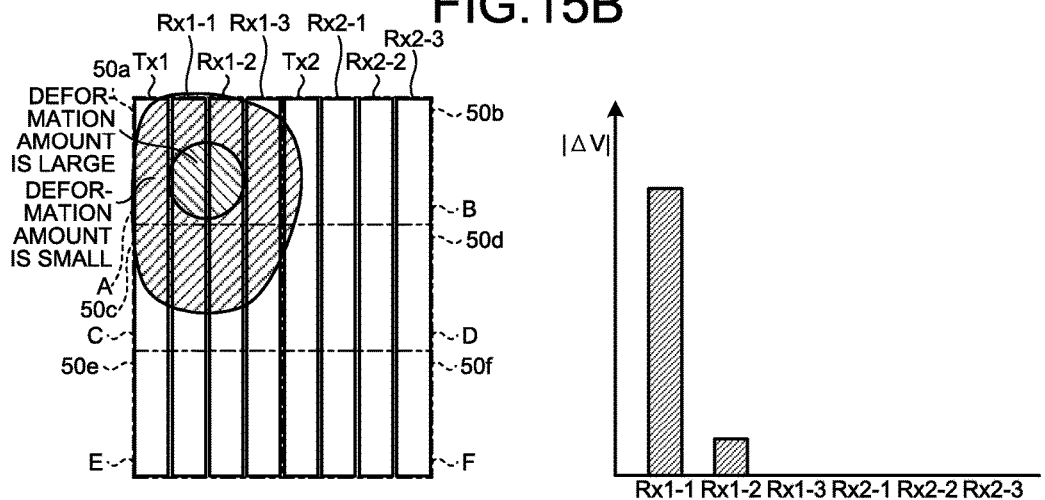
Figure 15C:
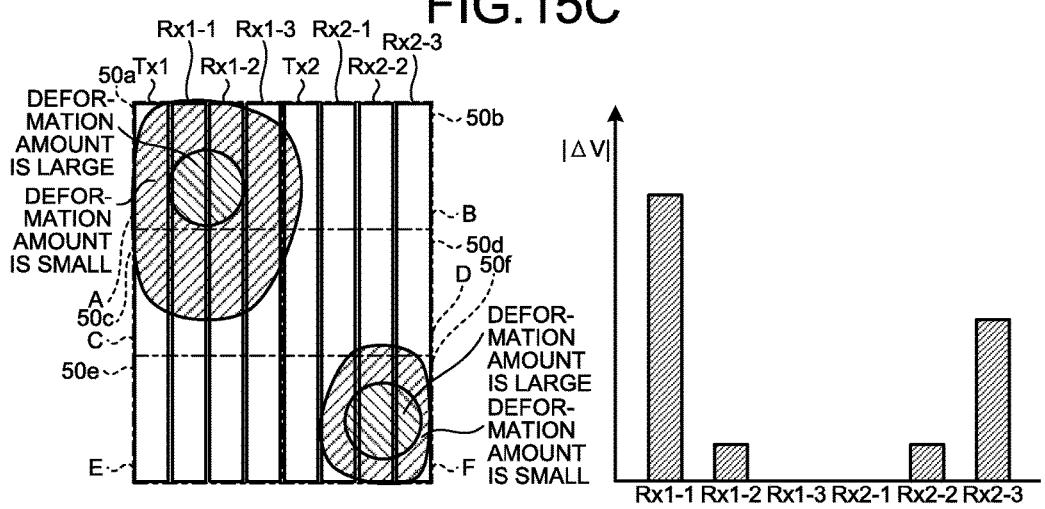

FIG. 13 is a diagram of an example of an electric coupling state of the first electrode and the second electrode and the detector during force calculation processing by the touch detection function-equipped display apparatus according to the first modification of the first embodiment. FIG. 14 is a diagram of an example of an arrangement pattern of electrodes in the touch detection function-equipped display apparatus according to the first modification of the first embodiment. FIGS. 15A, 15B, and 15C are diagrams of examples of the detection value in the arrangement pattern of the electrodes illustrated in FIG. 14. The areas of the touch detection function-equipped display device 10 that become deformed and their deformation amounts in FIGS. 15A, 15B, and 15C are assumed to be the same as those in the examples illustrated in FIGS. 12A, 12B, and 12C.

The example illustrated in FIG. 13 illustrates an example in which, among the eight drive electrodes COML, the drive electrodes COML positioned at the first column and the fifth column numbered from the left of the arrangement direction of the drive electrodes COML are designated as the first electrode E1, whereas the other drive electrodes COML are designated as the second electrode E2, thus causing the drive electrodes COML to have respective roles during touch detection. In the following description, in the example illustrated in FIG. 13, the eight drive electrodes COML are referred to as the transmission electrode Tx1 as the first electrode E1; the reception electrode Rx1-1, the reception electrode Rx1-2, and the reception electrode Rx1-3 as the second electrode E2; the transmission electrode Tx2 as the first electrode E1; and the reception electrode Rx2-1, the reception electrode Rx2-2, and the reception electrode Rx2-3 as the second electrode E2 in order from the leftmost drive electrode COML.

The second drive driver 41-2 applies the fifth drive signal Vd5 (Tx1) to the transmission electrode Tx1, whereas the second drive driver 41-2 applies the fifth drive signal Vd5 (Tx2) to the transmission electrode Tx2. The example illustrated in FIG. 13 omits the drive signal switch 140.

The reception electrode Rx1-1 outputs the fifth detection signal Vdet5 (Rx1-1) to the second detector 42-2, the reception electrode Rx1-2 outputs the fifth detection signal Vdet5 (Rx1-2) to the second detector 42-2, the reception electrode Rx1-3 outputs the fifth detection signal Vdet5 (Rx1-3) to the second detector 42-2, the reception electrode Rx2-1 outputs the fifth detection signal Vdet5 (Rx2-1) to the second detector 42-2, the reception electrode Rx2-2 outputs the fifth detection signal Vdet5 (Rx2-2) to the second detector 42-2, and the reception electrode Rx2-3 outputs the fifth detection signal Vdet5 (Rx2-3) to the second detector 42-2.

In the example illustrated in FIG. 14, the drive electrode COML formation area is divided into six areas including up-and-down three rows and right-and-left two columns; the floating electrode 50a is arranged astride the transmission electrode Tx1 and the reception electrode Rx1-1 in the upper-row, left area A in FIG. 14. The floating electrode 50b is arranged astride the transmission electrode Tx2 and the reception electrode Rx2-1 in the upper-row, right area B in FIG. 14. The floating electrode 50c is arranged astride the transmission electrode Tx1 and the reception electrode Rx1-2 in the middle-row, left area C in FIG. 14. The floating electrode 50*d* is arranged astride the transmission electrode Tx2 and the reception electrode Rx2-2 in the middle-row, right area D in FIG. 14. The floating electrode 50*e* is arranged astride the transmission electrode Tx1 and the reception electrode Rx1-3 in the lower-row, left area E in FIG. 14. The floating electrode 50*f* is arranged astride the transmission electrode Tx2 and the reception electrode Rx2-3 in the lower-row, right area F in FIG. 14. In the example illustrated in FIG. 14, a part overlapping with the reception electrode Rx1-1 of the floating electrode 50*c*, a part overlapping with the reception electrode Rx2-1 of the floating electrode 50*d*, parts overlapping with the reception electrodes Rx1-1 and Rx1-2 of the floating electrode 50*e*, and parts overlapping with the reception electrodes Rx2-1 and Rx2-2 of the floating electrode 50*f* are wired thinly enough to allow capacitance components caused thereby to be ignored.

Also in the configuration illustrated in FIG. 13 and FIG. 14, the three reception electrodes Rx1-1, Rx1-2, and Rx1-3 (the second electrode E2) are arranged by the side of the transmission electrode Tx1 (the first electrode E1), whereas the three reception electrodes Rx2-1, Rx2-2, and Rx2-3 (the second electrode E2) are arranged by the side of the transmission electrode Tx2 (the first electrode E1).

Also in the configuration illustrated in FIG. 13 and FIG. 14, the three reception electrodes Rx1-1, Rx1-2, and Rx1-3 (the second electrode E2) form the combined capacitance element C1 together with one transmission electrode Tx1 (the first electrode E1), whereas the three reception electrodes Rx2-1, Rx2-2, and Rx2-3 (the second electrode E2) form the combined capacitance element C1 together with one transmission electrode Tx2 (the first electrode E1). In other words, also in the configuration illustrated in FIG. 13 and FIG. 14, there is no reception electrode that forms the combined capacitance element C1 (refer to FIG. 5) together with both the transmission electrodes Tx1 and Tx2. Consequently, also in the configuration illustrated in FIG. 13 and FIG. 14, similarly to the configuration illustrated in FIG. 10 and FIG. 11 of the first embodiment as described above, the fifth drive signals Vd5 (Tx1) and Vd5 (Tx2) can be simultaneously transmitted to the respective transmission electrodes Tx1 and Tx2 (the first electrode E1) to perform parallel processing.

In the example illustrated in FIG. 14, when a force is applied to the area A, for example, the detection value |ΔV| in the reception electrode Rx1-1 is larger than the detection values |ΔV| in the other reception electrodes Rx1-2, Rx1-3, Rx2-1, Rx2-2, and Rx2-3.

When a force is applied to the area B illustrated in FIG. 14, for example, the detection values |ΔV| in the reception electrodes Rx2-1, Rx2-2, and Rx2-3 are larger than the detection values |ΔV| in the other reception electrodes Rx1-1, Rx1-2, and Rx1-3.

When a force is applied to the area C illustrated in FIG. 14, for example, the detection value |ΔV| in the reception electrode Rx1-2 is larger than the detection values |ΔV| in the other reception electrodes Rx1-1, Rx1-3, Rx2-1, Rx2-2, and Rx2-3.

When a force is applied to the area D illustrated in FIG. 14, for example, the detection value |ΔV| in the reception electrode Rx2-2 is larger than the detection values |ΔV| in the other reception electrodes Rx1-1, Rx1-2, Rx1-3, Rx2-1, and Rx2-3.

When a force is applied to the area E illustrated in FIG. 14, for example, the detection value |ΔV| in the reception electrode Rx1-3 is larger than the detection values |ΔV| in the other reception electrodes Rx1-1, Rx1-2, Rx2-1, Rx2-2, and Rx2-3.

When a force is applied to the area F illustrated in FIG. 14, for example, the detection value |ΔV| in the reception electrode Rx2-3 is larger than the detection values |ΔV| in the other reception electrodes Rx1-1, Rx1-2, Rx1-3, Rx2-1, and Rx2-2.

In the touch detection function-equipped display apparatus 1 according to the first modification of the first embodiment, when the distribution of the deformation amount of the touch detection function-equipped display device 10 becomes a state illustrated in FIG. 15A as a result of the display area 100 being pressed, for example, the detection value |ΔV| in the reception electrode Rx1-3 is the largest value, and the detection value |ΔV| in the reception electrodes Rx1-2 adjacent to the reception electrode Rx1-3 is the next largest value following the detection value |ΔV| in the reception electrode Rx1-3.

When the distribution of the deformation amount of the touch detection function-equipped display device 10 becomes a state illustrated in FIG. 15B, for example, the detection value |ΔV| in the reception electrode Rx1-1 is the largest value, and the detection value |ΔV| in the reception electrode Rx1-2 adjacent to the reception electrode Rx1-1 is the next largest value following the detection value |ΔV| in the reception electrode Rx1-1.

When the distribution of the deformation amount of the touch detection function-equipped display device 10 becomes a state illustrated in FIG. 15C, for example, the detection value |ΔV| in the reception electrode Rx1-1 is the largest value, and the detection value |ΔV| in the reception electrode Rx2-3 is the next largest value following the detection value |ΔV| in the reception electrode Rx1-1.

A difference in the magnitude of the detection value |ΔV| between the adjacent reception electrodes is larger than that of the detection value (FIG. 12) in the arrangement pattern of the electrodes illustrated in FIG. 11. Specifically, in the example illustrated in FIG. 15A, the detection value |ΔV| in the reception electrode Rx1-3 is the largest, whereas the detection value |ΔV| in the reception electrode Rx1-2 adjacent to the reception electrode Rx1-3 is extremely small. In the example illustrated in FIG. 15B, the detection value |ΔV| in the reception electrode Rx1-1 is the largest, whereas the detection value |ΔV| in the reception electrode Rx1-2 adjacent to the reception electrode Rx1-1 is extremely small. In the example illustrated in FIG. 15C, the detection value |ΔV| in the reception electrode Rx1-1 is the largest, whereas the detection value |ΔV| in the reception electrode Rx1-2 adjacent to the reception electrode Rx1-1 is extremely small, and besides, the detection value |ΔV| in the reception electrode Rx2-2 adjacent to the reception electrode Rx2-3, in which the detection value |ΔV| is the next largest following the detection value |ΔV| in the reception electrode Rx1-1, is extremely small.

Consequently, the arrangement pattern of the electrodes in the touch detection function-equipped display apparatus 1 according to the first modification of the first embodiment illustrated in FIG. 14 makes it easier to calculate a force at any position of the display area 100 than the arrangement pattern of the electrodes illustrated in FIG. 11.

Second Modification

Figure 16:
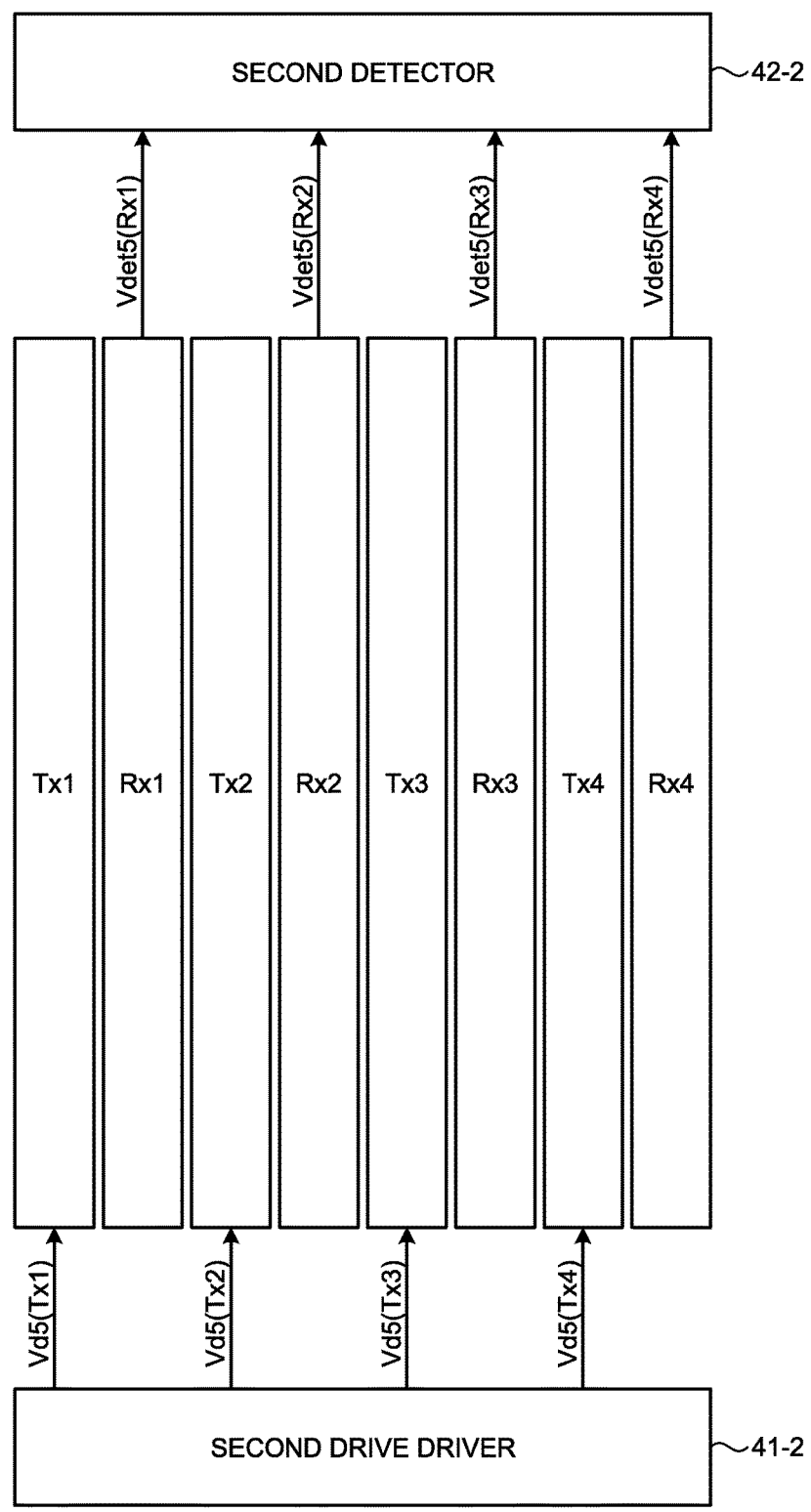
FIG. 16 is a diagram of an example of an electric coupling state of the first electrode and the second electrode and the detector during force calculation processing by the touch detection function-equipped display apparatus according to a second modification of the first embodiment.
Figure 17:
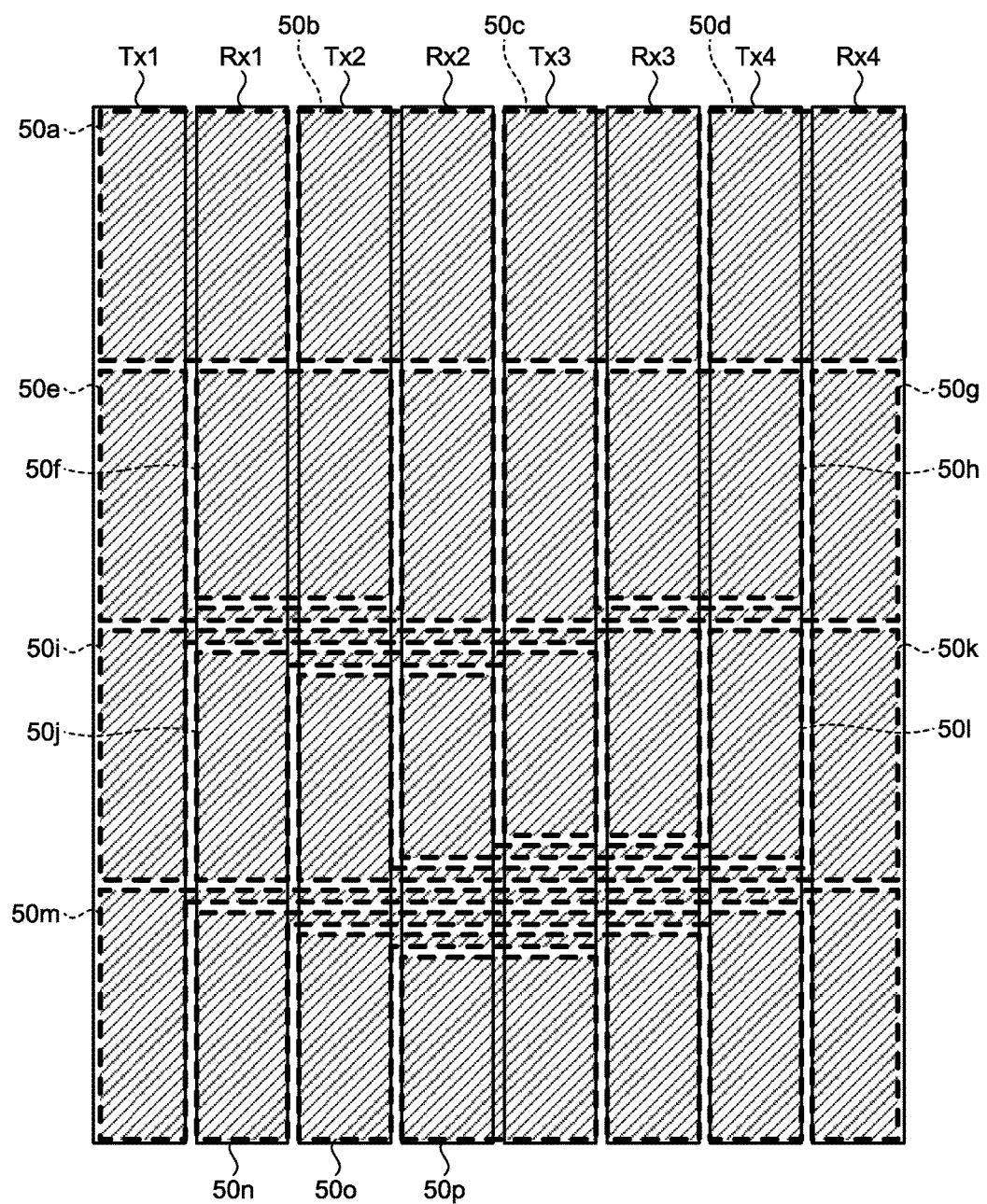
FIG. 17 is a diagram of an example of an arrangement pattern of electrodes in the touch detection function-equipped display apparatus according to the second modification of the first embodiment.

FIG. 16 is a diagram of an example of an electric coupling state of the first electrode and the second electrode and the detector during force calculation processing by the touch detection function-equipped display apparatus according to the second modification of the first embodiment. FIG. 17 is a diagram of an example of an arrangement pattern of electrodes in the touch detection function-equipped display apparatus according to the second modification of the first embodiment. FIGS. 10A, 10B, and 10C are diagrams of examples of the detection value in the arrangement pattern of the electrodes illustrated in FIG. 16. The areas of the touch detection function-equipped display device 10 that become deformed and their deformation amounts in FIGS. 10A, 10B, and 10C are assumed to be the same as those in the examples illustrated in FIGS. 12A, 12B, and 12C and FIGS. 15A, 15B, and 15C.

The example illustrated in FIG. 16 illustrates an example in which, among eight drive electrodes COML, the drive electrodes COML positioned at the odd columns from the left of the arrangement direction of the drive electrodes COML are designated as the first electrode E1, whereas the drive electrodes COML positioned at the even columns are designated as the second electrode E2, thus causing the drive electrodes COML to have respective roles during touch detection. In the following description, in the example illustrated in FIG. 16, the eight drive electrodes COML are referred to as the transmission electrode Tx1 as the first electrode E1, a reception electrode Rx1 as the second electrode E2, the transmission electrode Tx2 as the first electrode E1, a reception electrode Rx2 as the second electrode E2, a transmission electrode Tx3 as the first electrode E1, a reception electrode Rx3 as the second electrode E2, a transmission electrode Tx4 as the first electrode E1, and a reception electrode Rx4 as the second electrode E2 in order from the leftmost drive electrode COML.

The second drive driver 41-2 applies the fifth drive signal Vd5 (Tx1) to the transmission electrode Tx1. The second drive driver 41-2 applies the fifth drive signal Vd5 (Tx2) to the transmission electrode Tx2. The second drive driver 41-2 applies a fifth drive signal Vd5 (Tx3) to the transmission electrode Tx3. The second drive driver 41-2 applies a fifth drive signal Vd5 (Tx4) to the transmission electrode Tx4. The example illustrated in FIG. 16 omits the drive signal switch 140.

The reception electrode Rx1 outputs a fifth detection signal Vdet5 (Rx1) to the second detector 42-2, the reception electrode Rx2 outputs a fifth detection signal Vdet5 (Rx2) to the second detector 42-2, the reception electrode Rx3 outputs a fifth detection signal Vdet5 (Rx3) to the second detector 42-2, and the reception electrode Rx4 outputs a fifth detection signal Vdet5 (Rx4) to the second detector 42-2.

In the example illustrated in FIG. 17, the respective floating electrodes 50 are arranged astride the transmission electrode Tx1 and the reception electrode Rx1, the transmission electrode Tx1 and the reception electrode Rx2, the transmission electrode Tx1 and the reception electrode Rx3, the transmission electrode Tx1 and the reception electrode Rx4, the transmission electrode Tx2 and the reception electrode Rx1, the transmission electrode Tx2 and the reception electrode Rx2, the transmission electrode Tx2 and the reception electrode Rx3, the transmission electrode Tx2 and the reception electrode Rx4, the transmission electrode Tx3 and the reception electrode Rx1, the transmission electrode Tx3 and the reception electrode Rx2, the transmission electrode Tx3 and the reception electrode Rx3, the transmission electrode Tx3 and the reception electrode Rx4, the transmission electrode Tx4 and the reception electrode Rx1, the transmission electrode Tx4 and the reception electrode Rx2, the transmission electrode Tx4 and the reception electrode Rx3, and the transmission electrode Tx4 and the reception electrode Rx4. In the example illustrated in FIG. 17, parts arranged astride electrodes that are not adjacent to each other are wired thinly enough to allow capacitance components caused thereby to be ignored.

In the configuration illustrated in FIG. 16 and FIG. 17, there are 16 (4*4) combinations of the first electrode E1 and the second electrode E2 forming the combined capacitance element C1 (refer to FIG. 5) via the third electrode E3 (floating electrodes 50a, 50b, 50c, 50d, 50e, 50f, 50g, 50h, 50i, 50j, 50k, 50l, 50m, 50n, 50o, and 50p) when they are represented by (transmission electrode Txn; floating electrode; reception electrode Rxm):

(Tx1; floating electrode 50a; Rx1)
(Tx1; floating electrode 50e; Rx2)
(Tx1; floating electrode 50i; Rx3)
(Tx1; floating electrode 50m; Rx4)
(Tx2; floating electrode 50b; Rx2)
(Tx2; floating electrode 50f; Rx1)
(Tx2; floating electrode 50k; Rx4)
(Tx2; floating electrode 50o; Rx3)
(Tx3; floating electrode 50c; Rx3)
(Tx3; floating electrode 50g; Rx4)
(Tx3; floating electrode 50j; Rx1)
(Tx3; floating electrode 50p; Rx2)
(Tx4; floating electrode 50d; Rx4)
(Tx4; floating electrode 50h; Rx3)
(Tx4; floating electrode 50l; Rx2)
(Tx4; floating electrode 50n; Rx1)

In the configuration illustrated in FIG. 16 and FIG. 17, one reception electrode Rx1 (the second electrode E2) is arranged by the side of the transmission electrode Tx1 (the first electrode E1), one reception electrode Rx2 (the second electrode E2) is arranged by the side of the transmission electrode Tx2 (the first electrode E1), one reception electrode Rx3 (the second electrode E2) is arranged by the side of the transmission electrode Tx3 (the first electrode E1), and one reception electrode Rx4 (the second electrode E2) is arranged by the side of the transmission electrode Tx4 (the first electrode E1).

In the configuration illustrated in FIG. 16 and FIG. 17, all the transmission electrodes Rx1, Rx2, Rx3, and Rx4 (the second electrode E2) form the combined capacitance element C1 together with all the transmission electrodes Tx1, Tx2, Tx3, and Tx4 (the first electrode E1). Consequently, in the configuration illustrated in FIG. 16 and FIG. 17, it is necessary that the fifth drive signals Vd5 (Tx1), Vd5 (Tx2), Vd5 (Tx3), and Vd5 (Tx4) be successively transmitted to the respective transmission electrodes Tx1, Tx2, Tx3, and Tx4 (the first electrode E1) and that time-division processing be performed.

In the touch detection function-equipped display apparatus 1 according to the second modification of the first embodiment, when the distribution of the deformation amount of the touch detection function-equipped display device 10 becomes a state illustrated in FIG. 18A as a result of the display area 100 being pressed, for example, at the time of transmission of the fifth drive signal Vd5 (Tx1), the detection value |ΔV| in the reception electrode Rx4 is the largest value, and the detection value |ΔV| in the reception electrode Rx3 is the next largest value following the detection value |ΔV| in the reception electrode Rx4. At the time of transmission of the fifth drive signal Vd5 (Tx2), the detection value |ΔV| in the reception electrode Rx3 is the largest value, and the detection value |ΔV| in the reception electrode Rx4 is the next largest value following the detection value |ΔV| in the reception electrode Rx3. At the time of transmission of the fifth drive signal Vd5 (Tx3), the detection value |ΔV| in the reception electrode Rx2 is the largest value, and the detection value |ΔV| in the reception electrode Rx1 is the next largest value following the detection value |ΔV| in the reception electrode Rx2. At the time of transmission of the fifth drive signal Vd5 (Tx4), the detection value |ΔV| in the reception electrode Rx1 is the largest value, and the detection value |ΔV| in the reception electrode Rx2 is the next largest value following the detection value |ΔV| in the reception electrode Rx1.

When the distribution of the deformation amount of the touch detection function-equipped display device 10 becomes a state illustrated in FIG. 18B, for example, at the time of transmission of the fifth drive signal Vd5 (Tx1), the detection value |ΔV| in the reception electrode Rx1 is the largest value, and the detection value |ΔV| in the reception electrode Rx2 is the next largest value following the detection value |ΔV| in the reception electrode Rx1. At the time of transmission of the fifth drive signal Vd5 (Tx2), the detection value |ΔV| in the reception electrode Rx1 is the largest value, and the detection value |ΔV| in the reception electrode Rx2 is the next largest value following the detection value |ΔV| in the reception electrode Rx1. At the time of transmission of the fifth drive signal Vd5 (Tx3) and at the time of transmission of the fifth drive signal Vd5 (Tx4), the detection values |ΔV| in the respective reception electrodes Rx1, Rx2, Rx3, and Rx4 are not detected.

When the distribution of the deformation amount of the touch detection function-equipped display device 10 becomes a state illustrated in FIG. 18C, for example, at the time of transmission of the fifth drive signal Vd5 (Tx1), the detection values |ΔV| in the reception electrodes Rx1 and Rx4 are larger, whereas the detection values |ΔV| in the reception electrodes Rx2 and Rx3 are smaller. At the time of transmission of the fifth drive signal Vd5 (Tx2), the detection values |ΔV| in the reception electrodes Rx1 and Rx3 are larger, whereas the detection values |ΔV| in the reception electrodes Rx2 and Rx4 are smaller. At the time of transmission of the fifth drive signal Vd5 (Tx3), the detection value |ΔV| in the reception electrode Rx2 is the largest value, and the detection value |ΔV| in the reception electrode Rx1 is the next largest value following the detection value |ΔV| in the reception electrode Rx2. At the time of transmission of the fifth drive signal Vd5 (Tx4), the detection value |ΔV| in the reception electrode Rx1 is the largest value, and the detection value |ΔV| in the reception electrode Rx2 is the next largest value following the detection value |ΔV| in the reception electrode Rx1.

The signal processor 44 appropriately analyzes the detection values |ΔV| in the respective reception electrodes Rx1, Rx2, Rx3, and Rx4 subjected to time-division processing, whereby, similarly to the first embodiment and the first modification of the first embodiment, even when a force is applied to deform a plurality of areas of the touch detection function-equipped display device 10, the force at any position of the display area 100 can be calculated, and even when forces are applied to a plurality of places as illustrated in FIG. 18C, the forces at any positions of the display area 100 can be calculated.

Third Modification

Figure 20:
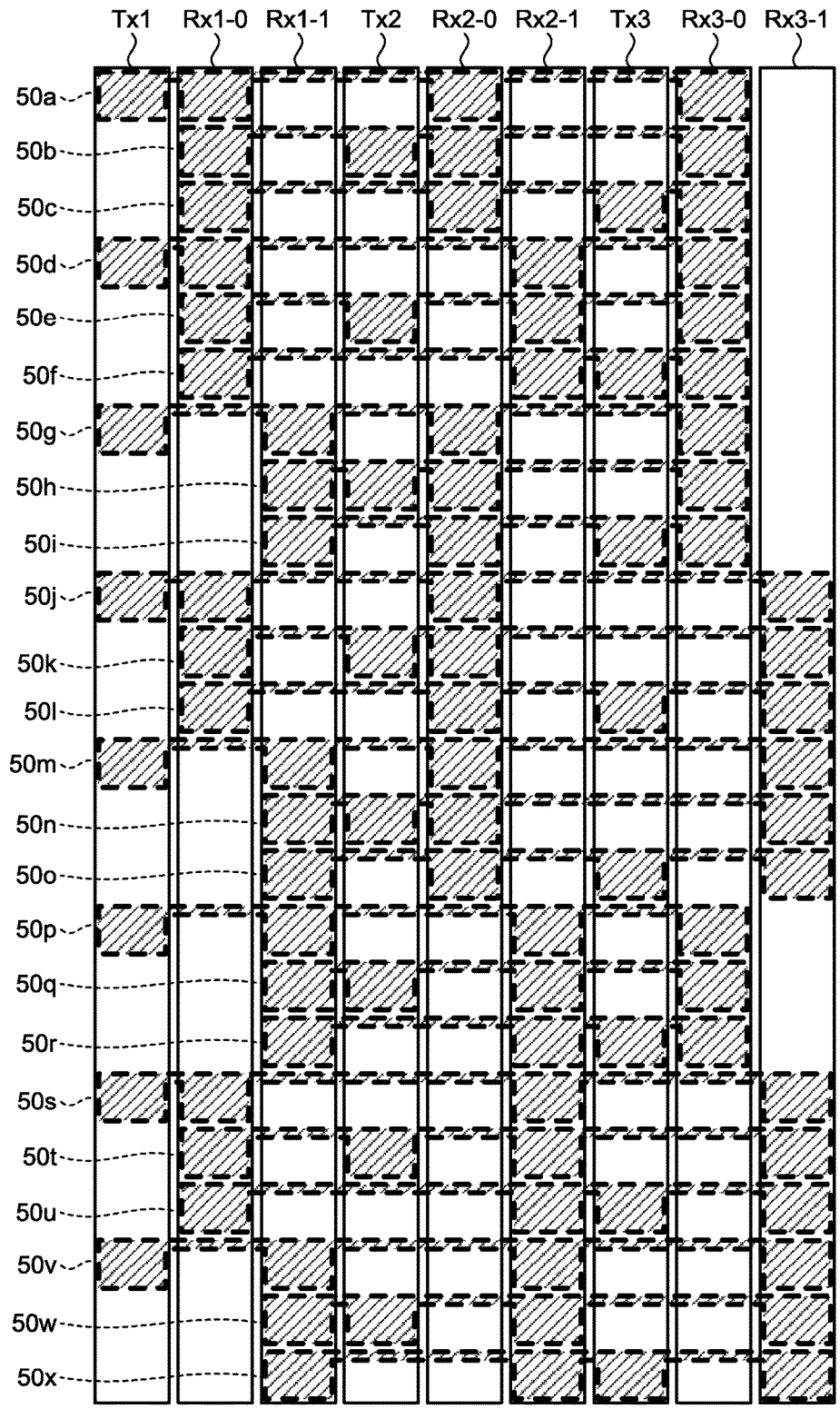
FIG. 20 is a diagram of an example of an arrangement pattern of electrodes in the touch detection function-equipped display apparatus according to the third modification of the first embodiment.
Figure 21A:
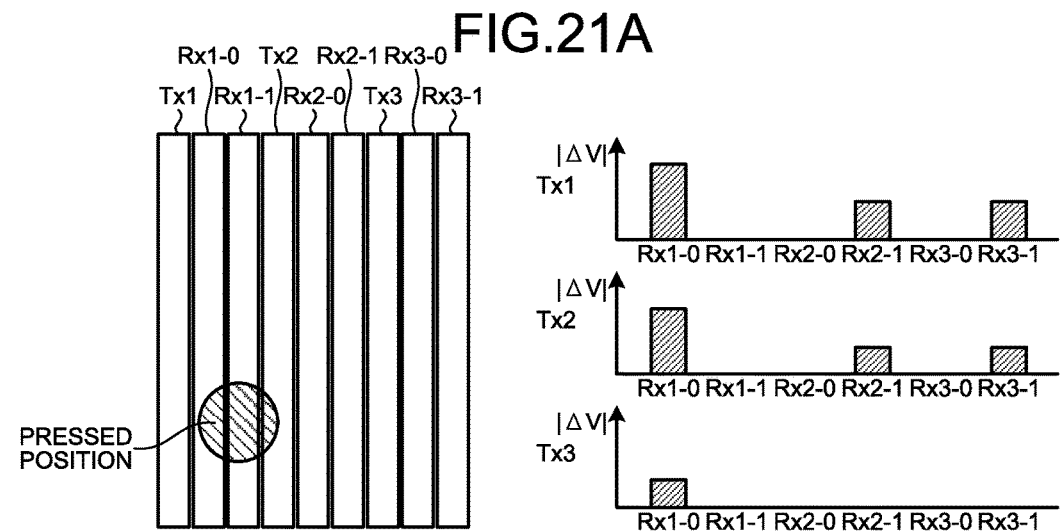
FIGS. 21A, 21B, and 21C are diagrams of examples of the detection value in the arrangement pattern of the electrodes illustrated in FIG. 20.
Figure 21B:
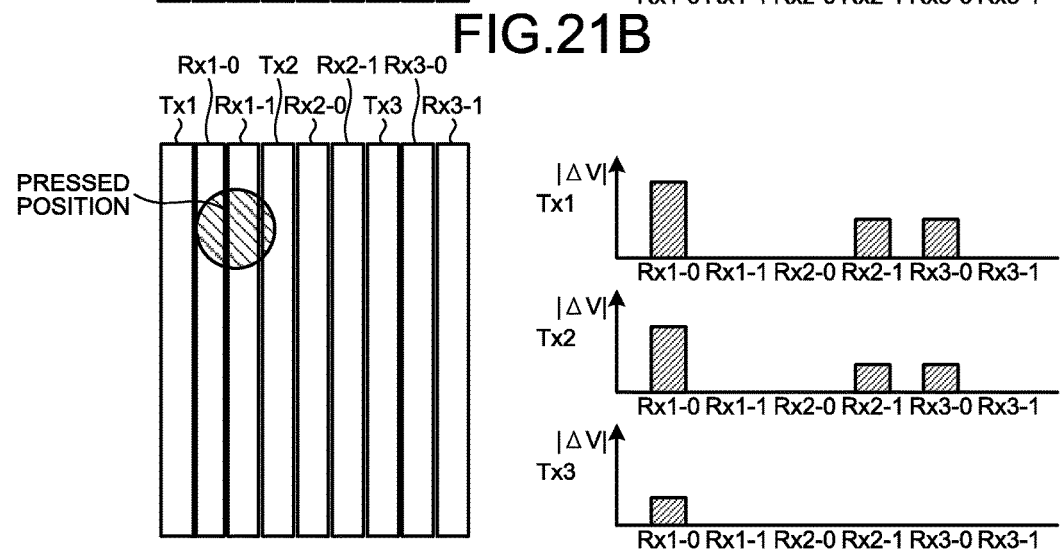
Figure 21C:
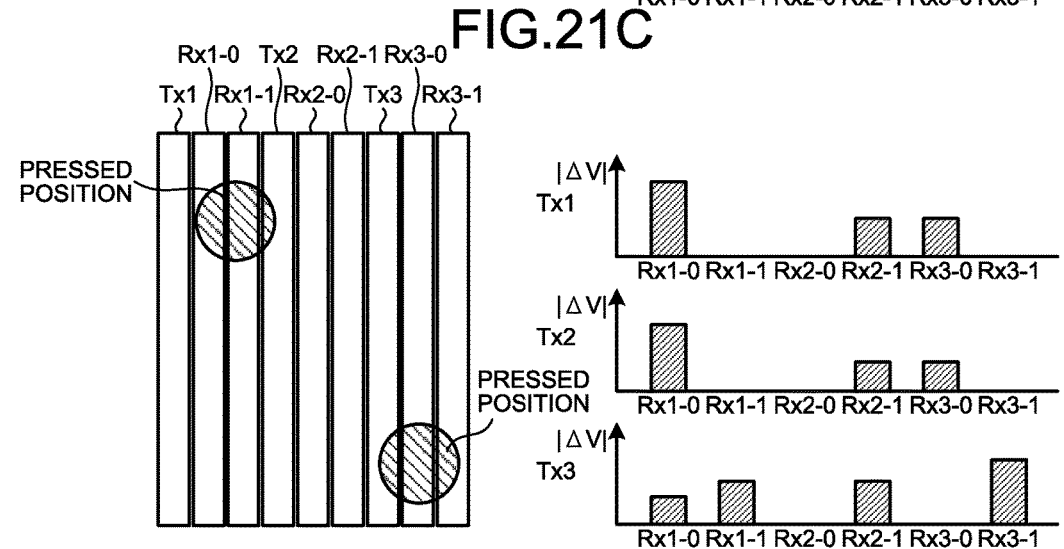

FIG. 19 is a diagram of an example of an electric coupling state of the first electrode and the second electrode and the detector during force calculation processing by the touch detection function-equipped display apparatus according to the third modification of the first embodiment. FIG. 20 is a diagram of an example of an arrangement pattern of electrodes in the touch detection function-equipped display apparatus according to the third modification of the first embodiment. FIGS. 21A, 21B, and 21C are diagrams of examples of the detection value in the arrangement pattern of the electrodes illustrated in FIG. 20. Pressed positions in FIGS. 21A, 21B, and 21C are assumed to be the same as the respective positions at which the deformation amount is large in the examples illustrated in FIGS. 12A, 12B, and 12C, FIGS. 15A, 15B, and 15C, and FIGS. 18A, 18B, and 18C.

The example illustrated in FIG. 19 illustrates an example in which, among nine drive electrodes COML, the drive electrodes COML positioned at the first column, the fourth column, and the seventh column numbered from the left are designated as the first electrode E1, whereas the other drive electrodes COML are designated as the second electrode E2, thus causing the drive electrodes COML to have respective roles during touch detection. In the following description, in the example illustrated in FIG. 19, the nine drive electrodes COML are referred to as the transmission electrode Tx1 as the first electrode E1; a reception electrode Rx1-0 and the reception electrode Rx1-1 as the second electrode E2; the transmission electrode Tx2 as the first electrode E1; a reception electrode Rx2-0 and the reception electrode Rx2-1 as the second electrode E2; the transmission electrode Tx3 as the first electrode E1; and a reception electrode Rx3-0 and a reception electrode Rx3-1 as the second electrode E2 in order from the leftmost drive electrode COML.

The second drive driver 41-2 applies the fifth drive signal Vd5 (Tx1) to the transmission electrode Tx1. The second drive driver 41-2 applies the fifth drive signal Vd5 (Tx2) to the transmission electrode Tx2. The second drive driver 41-2 applies the fifth drive signal Vd5 (Tx3) to the transmission electrode Tx3. The example illustrated in FIG. 19 omits the drive signal switch 140.

The reception electrode Rx1-0 outputs a fifth detection signal Vdet5 (Rx1-0) to the second detector 42-2, the reception electrode Rx1-1 outputs the fifth detection signal Vdet5 (Rx1-1) to the second detector 42-2, the reception electrode Rx2-0 outputs a fifth detection signal Vdet5 (Rx2-0) to the second detector 42-2, the reception electrode Rx2-1 outputs the fifth detection signal Vdet5 (Rx2-1) to the second detector 42-2, the reception electrode Rx3-0 outputs a fifth detection signal Vdet5 (Rx3-0) to the second detector 42-2, and the reception electrode Rx3-1 outputs a fifth detection signal Vdet5 (Rx3-1) to the second detector 42-2.

In the example illustrated in FIG. 20, respective floating electrodes 50 are provided based on 24 (=3*8) combinations including the transmission electrode Tx1 and the reception electrodes Rx1-0, Rx2-0, and Rx3-0; the transmission electrode Tx1 and the reception electrodes Rx1-0, Rx2-1, and Rx3-0; the transmission electrode Tx1 and the reception electrodes Rx1-1, Rx2-0, and Rx3-0; the transmission electrode Tx1 and the reception electrodes Rx1-0, Rx2-0, and Rx3-1; the transmission electrode Tx1 and the reception electrodes Rx1-1, Rx2-0, and Rx3-1; the transmission electrode Tx1 and the reception electrodes Rx1-1, Rx2-1, and Rx3-0; the transmission electrode Tx1 and the reception electrodes Rx1-0, Rx2-1, and Rx3-1; the transmission electrode Tx1 and the reception electrodes Rx1-1, Rx2-1, and Rx3-1; the transmission electrode Tx2 and the reception electrodes Rx1-0, Rx2-0, and Rx3-0; the transmission electrode Tx2 and the reception electrodes Rx1-0, Rx2-1, and Rx3-0; the transmission electrode Tx2 and the reception electrodes Rx1-1, Rx2-0, and Rx3-0; the transmission electrode Tx2 and the reception electrodes Rx1-0, Rx2-0, and Rx3-1; the transmission electrode Tx2 and the reception electrodes Rx1-1, Rx2-0, and Rx3-1; the transmission electrode Tx2 and the reception electrodes Rx1-1, Rx2-1, and Rx3-0; the transmission electrode Tx2 and the reception electrodes Rx1-0, Rx2-1, and Rx3-1; the transmission electrode Tx2 and the reception electrodes Rx1-1, Rx2-1, and Rx3-1; the transmission electrode Tx3 and the reception electrodes Rx1-0, Rx2-0, and Rx3-0; the transmission electrode Tx3 and the reception electrodes Rx1-0, Rx2-1, and Rx3-0; the transmission electrode Tx3 and the reception electrodes Rx1-1, Rx2-0, and Rx3-0; the transmission electrode Tx3 and the reception electrodes Rx1-0, Rx2-0, and Rx3-1; the transmission electrode Tx3 and the reception electrodes Rx1-1, Rx2-0, and Rx3-1; the transmission electrode Tx3 and the reception electrodes Rx1-1, Rx2-1, and Rx3-0; the transmission electrode Tx3 and the reception electrodes Rx1-0, Rx2-1, and Rx3-1; and the transmission electrode Tx3 and the reception electrodes Rx1-1, Rx2-1, and Rx3-1. In the example illustrated in FIG. 20, parts arranged astride electrodes that are not adjacent to each other are wired thinly enough to allow capacitance components caused thereby to be ignored.

In the configuration illustrated in FIG. 19 and FIG. 20, there are 18 (=3*6) combinations of the first electrode E1 and the second electrode E2 forming the combined capacitance element C1 (refer to FIG. 5) via the third electrode E3 (floating electrodes 50$a$, 50$b$, 50$c$, 50$d$, 50$e$, 50$f$, 50$g$, 50$h$, 50$i$, 50$j$, 50$k$, 50$l$, 50$m$, 50$n$, 50$o$, 50$p$, 50$q$, 50$r$, 50$s$, 50$t$, 50$u$, 50$v$, 50$w$, and 50$x$) when they are represented by (transmission electrode Tx$n$; floating electrodes; reception electrode Rx$m$):

(Tx1; floating electrodes 50$a$, 50$d$, 50$j$, 50$s$; Rx1-0)
(Tx1; floating electrodes 50$g$, 50$m$, 50$p$, 50$v$; Rx1-1)
(Tx1; floating electrodes 50$a$, 50$g$, 50$j$, 50$m$; Rx2-0)
(Tx1; floating electrodes 50$d$, 50$p$, 50$s$, 50$v$; Rx2-1)
(Tx1; floating electrodes 50$a$, 50$d$, 50$g$, 50$p$; Rx3-0)
(Tx1; floating electrodes 50$j$, 50$m$, 50$s$, 50$v$; Rx3-1)
(Tx2; floating electrodes 50$b$, 50$e$, 50$k$, 50$t$; Rx1-0)
(Tx2; floating electrodes 50$h$, 50$n$, 50$q$, 50$w$; Rx1-1)
(Tx2; floating electrodes 50$b$, 50$h$, 50$k$, 50$n$; Rx2-0)
(Tx2; floating electrodes 50$e$, 50$q$, 50$t$, 50$w$; Rx2-1)
(Tx2; floating electrodes 50$b$, 50$e$, 50$h$, 50$q$; Rx3-0)
(Tx2; floating electrodes 50$k$, 50$n$, 50$t$, 50$w$; Rx3-1)
(Tx3; floating electrodes 50$c$, 50$f$, 50$l$, 50$u$; Rx1-0)
(Tx3; floating electrodes 50$i$, 50$o$, 50$r$, 50$x$; Rx1-1)
(Tx3; floating electrodes 50$c$, 50$i$, 50$l$, 50$o$; Rx2-0)
(Tx3; floating electrodes 50$f$, 50$r$, 50$u$, 50$x$; Rx2-1)
(Tx3; floating electrodes 50$c$, 50$f$, 50$i$, 50$r$; Rx3-0)
(Tx3; floating electrodes 50$l$, 50$o$, 50$u$, 50$x$; Rx3-1)

In other words, in the configuration illustrated in FIG. 19 and FIG. 20, all the reception electrodes Rx1-0, Rx1-1, Rx2-0, Rx2-1, Rx3-0, and Rx3-1 form the combined capacitance element C1 together with all the transmission electrodes Tx1, Tx2, and Tx3.

In the configuration illustrated in FIG. 19 and FIG. 20, two reception electrodes Rx1-0 and Rx1-1 (the second electrode E2) are arranged by the side of the transmission electrode Tx1 (the first electrode E1), two reception electrodes Rx2-0 and Rx2-1 (the second electrode E2) are arranged by the side of the transmission electrode Tx2 (the first electrode E1), and two reception electrodes Rx3-0 and Rx3-1 (the second electrode E2) are arranged by the side of the transmission electrode Tx3 (the first electrode E1).

In the configuration illustrated in FIG. 19 and FIG. 20, all the transmission electrodes Rx1-0, Rx1-1, Rx2-0, Rx2-1, Rx3-0, and Rx3-1 (the second electrode E2) form the combined capacitance element C1 together with all the transmission electrodes Tx1, Tx2, and Tx3 (the first electrode E1). Consequently, also in the configuration illustrated in FIG. 19 and FIG. 20, similarly to the configuration illustrated in FIG. 16 and FIG. 17 of the second modification of the first embodiment, it is necessary that the fifth drive signals Vd5 (Tx1), Vd5 (Tx2), and Vd5 (Tx3) be successively transmitted to the respective transmission electrodes Tx1, Tx2, and Tx3 (the first electrode E1) and that time-division processing be performed.

In the touch detection function-equipped display apparatus 1 according to the third modification of the first embodiment, when the display area 100 is pressed at a position illustrated in FIG. 21A, for example, at the time of transmission of the fifth drive signal Vd5 (Tx1), the detection values |ΔV| appear in the reception electrodes Rx1-0, Rx2-1, and Rx3-1. At the time of transmission of the fifth drive signal Vd5 (Tx2), the detection values |ΔV| appear in the reception electrodes Rx1-0, Rx2-1, and Rx3-1. At the time of transmission of the fifth drive signal Vd5 (Tx3), the detection value |ΔV| appears in the reception electrode Rx1-0.

When the display area 100 is pressed at a position illustrated in FIG. 21B, for example, at the time of transmission of the fifth drive signal Vd5 (Tx1), the detection values |ΔV| appear in the reception electrodes Rx1-0, Rx2-1, and Rx3-0. At the time of transmission of the fifth drive signal Vd5 (Tx2), the detection values |ΔV| appear in the reception electrodes Rx1-0, Rx2-1, and Rx3-0. At the time of transmission of the fifth drive signal Vd5 (Tx3), the detection value |ΔV| appears in the reception electrode Rx1-0.

When the display area 100 is pressed at a plurality of positions illustrated in FIG. 21C, for example, at the time of transmission of the fifth drive signal Vd5 (Tx1), the detection values |ΔV| appear in the reception electrodes Rx1-0, Rx2-1, and Rx3-0. At the time of transmission of the fifth drive signal Vd5 (Tx2), the detection values |ΔV| appear in the reception electrodes Rx1-0, Rx2-1, and Rx3-0. At the time of transmission of the fifth drive signal Vd5 (Tx3), the detection values |ΔV| appear in the reception electrodes Rx1-0, Rx1-1, Rx2-1, and Rx3-1.

Also in the touch detection function-equipped display apparatus 1 according to the third modification of the first embodiment, similarly to the first embodiment, the first modification of the first embodiment, and the second modification of the first embodiment, the signal processor 44 may analyze the detection values |ΔV| in the respective reception electrodes Rx1-0, Rx1-1, Rx2-0, Rx2-1, Rx3-0, and Rx3-1 subjected to time-division processing. With this analysis, although the number of combinations of the transmission electrode and the reception electrode is larger than those of the first embodiment, the first modification of the first embodiment, and the second modification of the first embodiment, and processing by the signal processor 44 when the force at the touch detection position detected by the first touch position detection processing, the second touch position detection processing, and the third touch position detection processing is calculated is slow, the detection values |ΔV| in the respective reception electrodes Rx1-0, Rx1-1, Rx2-0, Rx2-1, Rx3-0, and Rx3-1 are appropriately analyzed, whereby, similarly to the first embodiment, the first modification of the first embodiment, and the second modification of the first embodiment, even when a force is applied to deform a plurality of areas of the touch detection function-equipped display device 10, the force at any position of the display area 100 can be calculated, and even when forces are applied to a plurality of places as illustrated in FIG. 21C, the forces at any positions of the display area 100 can be calculated; the following processing is performed, whereby the processing by the signal processor 44 when the force at the touch detection position detected by the first touch position detection processing, the second touch position detection processing, and the third touch position detection processing is calculated can be reduced.

In the touch detection function-equipped display apparatus 1 according to the third modification of the first embodiment, the signal processor 44 compares the detection values |ΔV| in the respective reception electrodes Rx1-0, Rx1-1, Rx2-0, Rx2-1, Rx3-0, and Rx3-1 subjected to time-division processing with a certain threshold voltage and determines a determination result to be "0" if each of the detection values |ΔV| is less than this threshold voltage. If each of the detection values |ΔV| in the respective reception electrodes Rx1-0, Rx1-1, Rx2-0, Rx2-1, Rx3-0, and Rx3-1 is the threshold voltage or more, the signal processor 44 determines the determination result to be "1." From the determination results for the respective reception electrodes Rx1-0, Rx1-1, Rx2-0, Rx2-1, Rx3-0, and Rx3-1 subjected to time-division processing, the signal processor 44 determines a position (a force imparted position) at which the display area 100 has been pressed.

By performing this processing, a force determining area can be reduced to the periphery of the force imparted position, for example. Consequently, the signal processor 44 can reduce the processing by the signal processor 44 when the force at the touch detection position detected by the first touch position detection processing, the second touch position detection processing, and the third touch position detection processing is calculated.

Second Embodiment

Figure 22:
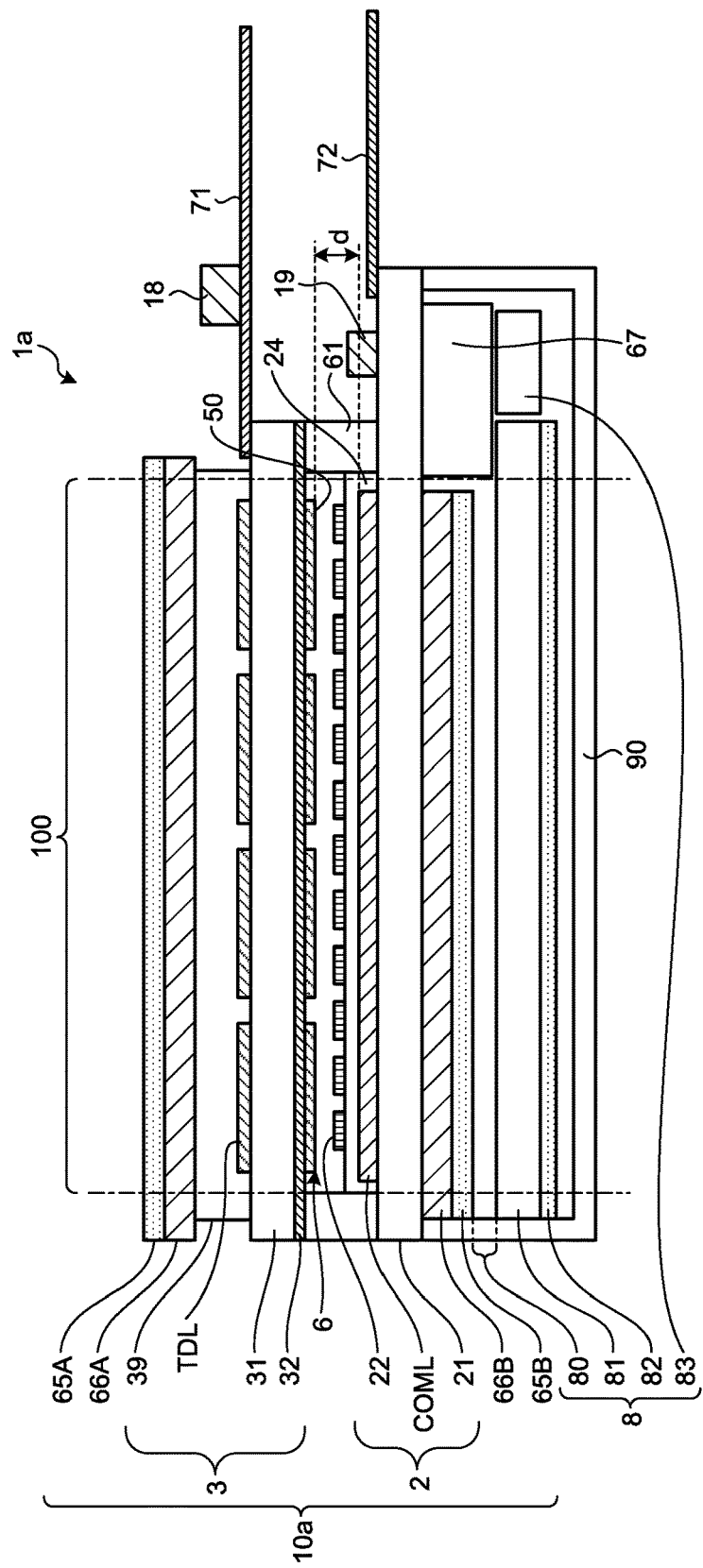
FIG. 22 is a sectional view of a schematic sectional structure of a touch detection function-equipped display apparatus according to a second embodiment.
Figure 23:
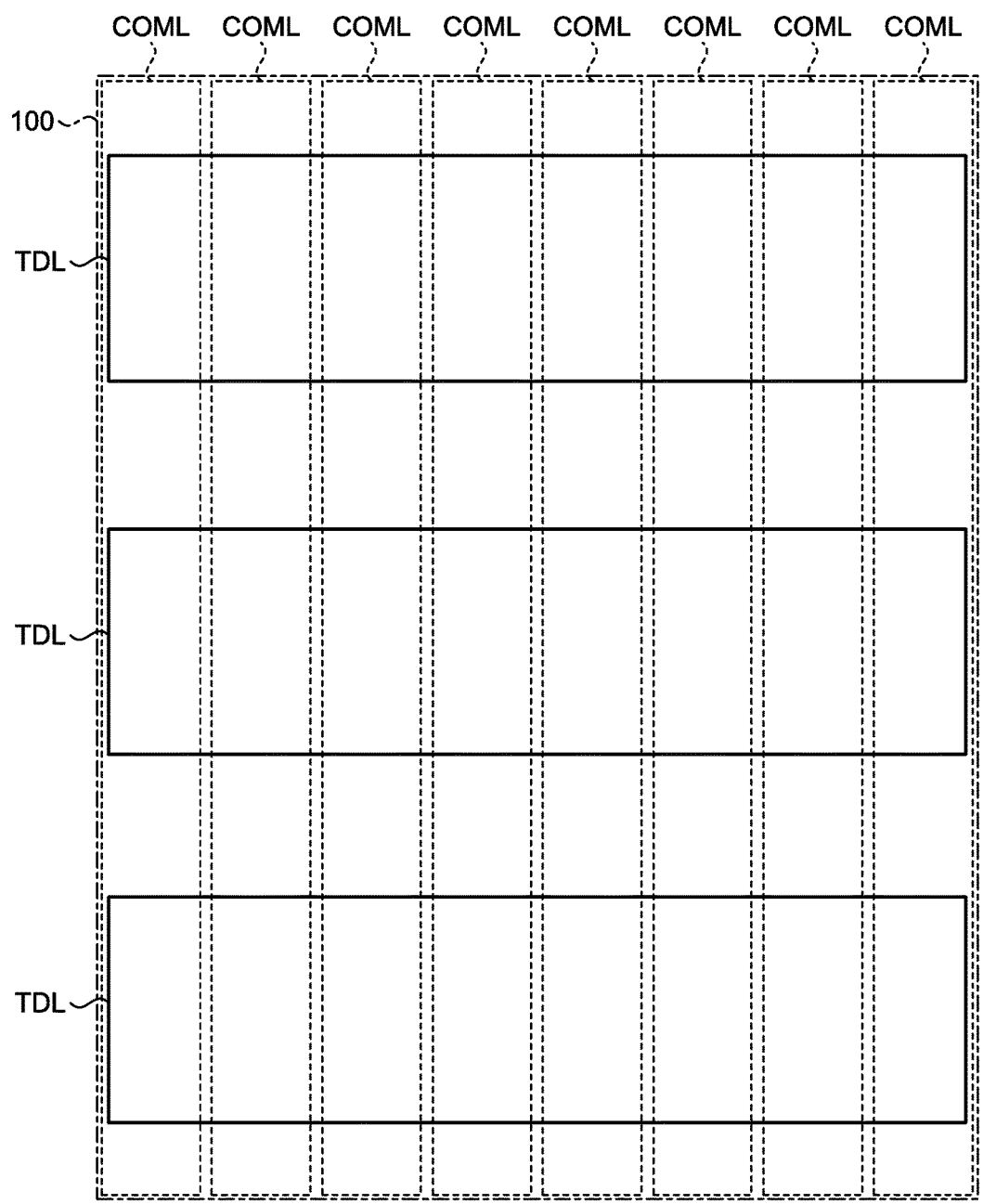
FIG. 23 is a plan view of an arrangement example of the drive electrodes and the detection electrodes of the touch detection function-equipped display apparatus according to the second embodiment when viewed in a direction perpendicular to a touch panel surface.
Figure 24:
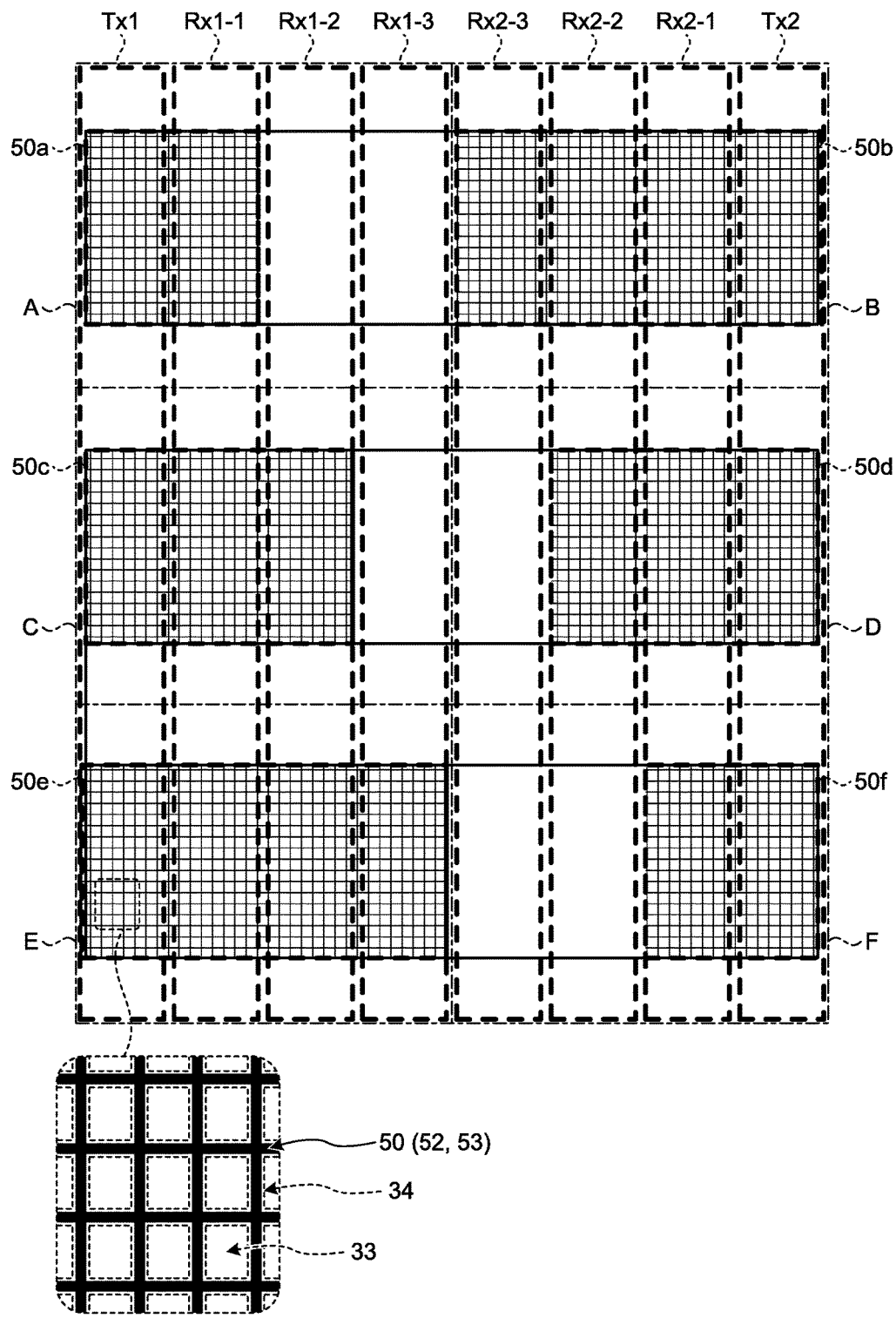
FIG. 24 is a diagram of an example of an arrangement pattern of electrodes in the touch detection function-equipped display apparatus according to the second embodiment.

FIG. 22 is a sectional view of a schematic sectional structure of a touch detection function-equipped display apparatus according to the second embodiment. FIG. 23 is a plan view of an arrangement example of the drive electrodes and the detection electrodes of the touch detection function-equipped display apparatus according to the second embodiment when viewed in a direction perpendicular to a touch panel surface. FIG. 24 is a diagram of an example of an arrangement pattern of electrodes in the touch detection function-equipped display apparatus according to the second embodiment. The same components as those described in the first embodiment are denoted by the same symbols, and a duplicate description is omitted. The pixel arrangement of the touch detection function-equipped display apparatus according to the second embodiment, the electric coupling state of the first electrode and the second electrode and the detector during the force calculation processing of the touch detection function-equipped display apparatus according to the second embodiment, a specific description of the arrangement pattern of the electrodes in the touch detection function-equipped display apparatus according to the second embodiment, and a detection value in the arrangement pattern of the electrodes in the touch detection function-equipped display apparatus according to the second embodiment and specific examples thereof are similar to those of the first embodiment, the first modification of the first embodiment, the second modification of the first embodiment, and the third modification of the first embodiment, and a duplicate description is omitted. Although the example illustrated in FIG. 23 and FIG. 24 illustrates an example in which three detection electrodes TDL are orthogonal to eight drive electrodes COML, the number of the detection electrodes TDL and the number of the drive electrodes COML are not limited to these numbers.

As illustrated in FIG. 22, in this touch detection function-equipped display apparatus 1a according to the second embodiment, the floating electrodes 50 are arranged under the counter substrate 3, that is, on a face of a touch detection function-equipped display device 10a opposite to the image display face side. These floating electrodes 50 correspond to the third electrode E3 in FIG. 3 and FIG. 6.

In the second embodiment, the detection electrodes TDL, the floating electrodes 50 (the third electrode E3), and the drive electrodes COML are provided in this order from the image display face side of the touch detection function-equipped display device 10a. The floating electrodes 50 (the third electrode E3) are provided apart from the drive electrodes COML via the liquid crystal layer 6.

In the second embodiment, in the configuration, similarly to the first embodiment, the drive electrodes COML are caused to function as the first electrode E1 and the second electrode E2 illustrated in FIG. 3 and FIG. 6 to perform the second force calculation processing. In the second embodiment, the floating electrodes 50 correspond to the third electrode E3 illustrated in FIG. 3 and FIG. 6 as described above. In other words, the detection apparatus according to the second embodiment includes the first electrode E1 and the second electrode E2 by the drive electrodes COML, the third electrode E3 by the floating electrodes 50, and the second drive driver 41-2 and the second detector 42-2 in the detector 40.

In the second embodiment, owing to the liquid crystal layer 6 provided in between the pixel substrate 2 and the counter substrate 3, the counter substrate 3 becomes deformed as a result of the display area 100 being pressed, and the distance (spacing) d between the drive electrodes COML (the first electrode E1 and the second electrode E2) and the floating electrodes 50 (the third electrode E3) changes. The absolute value |ΔV| (refer to FIG. 7) of the voltage difference between the waveform $V_0$ and the waveform $V_1$ caused by the change in the distance (spacing) d between these drive electrodes COML (the first electrode E1 and the second electrode E2) and the floating electrodes 50 (the third electrode E3), that is, the change in the output signal along with the change in the capacitance of the combined capacitance element C1 including the first capacitance element C11 including the first electrode E1 and the third electrode E3 and the second capacitance element C12 including the second electrode E2 and the third electrode E3 that are coupled to each other in series is detected, whereby the force to the display area 100 can be calculated similarly to the first embodiment.

In the second embodiment, the floating electrodes 50 (the third electrode E3) are provided above the pixel electrodes 22, that is, on the image display face side of the touch detection function-equipped display device 10. Consequently, in the first touch position detection processing, in which the touch position detection processing is performed by the mutual capacitance type between the detection electrodes TDL and the drive electrodes COML, the floating electrodes 50 (the third electrode E3) are provided overlapping with the detection electrodes TDL in a direction perpendicular to the image display face as illustrated in FIG. 24 so as not to cause the floating electrodes 50 (the third electrode E3) to shield fringe-based capacitance present in between the first electrode E1 (the drive electrodes COML) and the second electrode E2 (the detection electrodes TDL).

The floating electrodes 50 (the third electrode E3) in the second embodiment include a mesh-like metallic wire 52 along the light shielding area 34 that separates pixel areas 33 provided for each of the pixel electrodes 22.

The metallic wire forming the floating electrodes 50 (the third electrode E3) is formed of at least one metallic material of aluminum (Al), copper (Cu), silver (Ag), molybdenum (Mo), or an alloy of these. The metallic wire may be a multilayer of a plurality of layers using one or more of these metallic materials. The at least one metallic material of aluminum (Al), copper (Cu), silver (Ag), molybdenum (Mo), or an alloy of these is, as a material for a translucent electrode, lower in resistance than translucent conductive oxides such as indium tin oxide (ITO). Since at least one metallic material of aluminum (Al), copper (Cu), silver (Ag), or an alloy of these has larger light shielding effect than the translucent conductive oxides such as ITO, transmittance may be reduced, or the pattern of the floating electrodes 50 (the third electrode E3) may be visually recognized. In the second embodiment, one floating electrode 50 (the third electrode E3) has a plurality of thin metallic wires, and the metallic wires are arranged in a mesh manner with a gap larger than the line width provided, thereby achieving a reduction in resistance and hiding.

The floating electrodes 50 (the third electrode E3) may be formed of a conductive light shielding film (a black matrix, for example) 53 forming the light shielding area 34.

Third Embodiment

Figure 25:
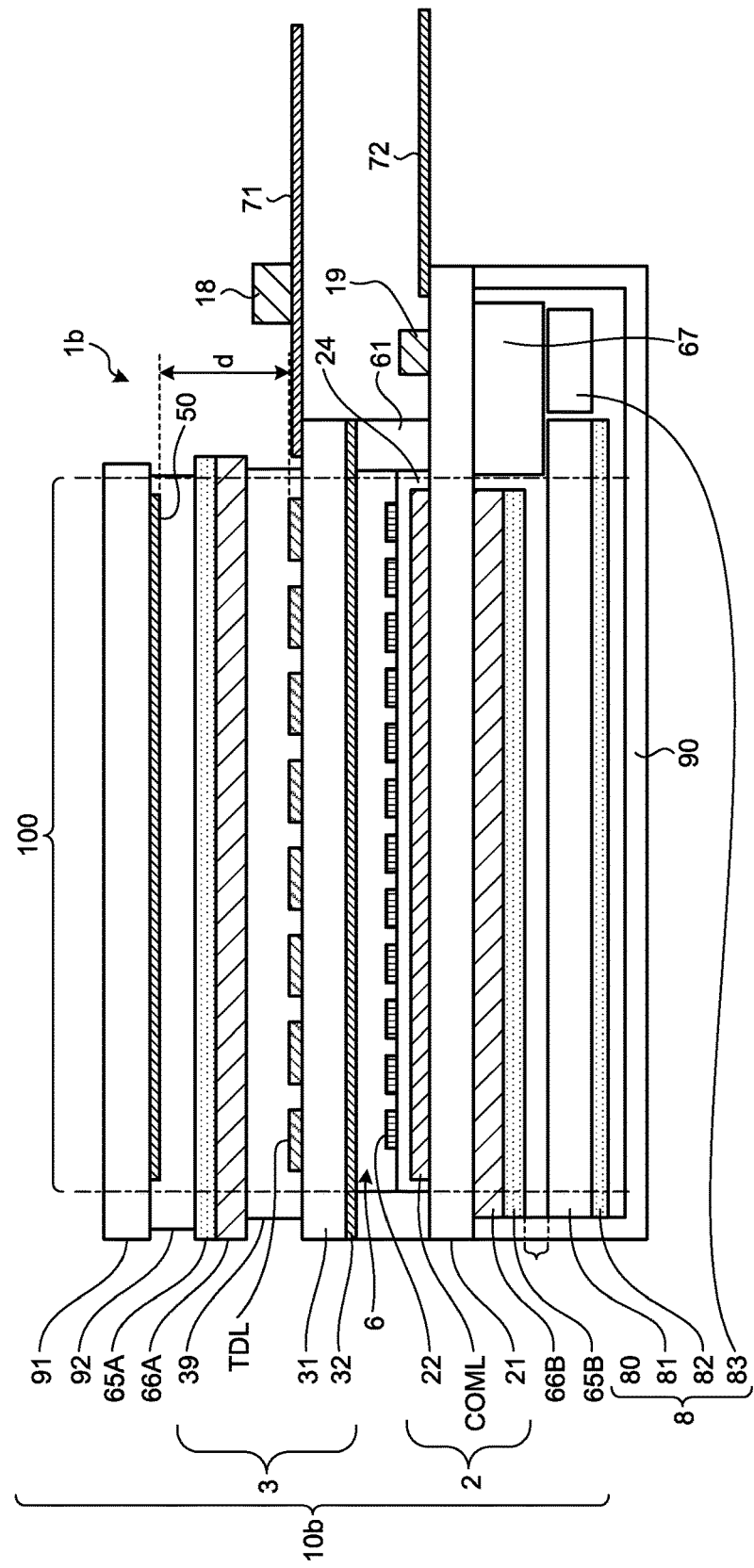
FIG. 25 is a sectional view of a schematic sectional structure of a touch detection function-equipped display apparatus according to a third embodiment.
Figure 26:
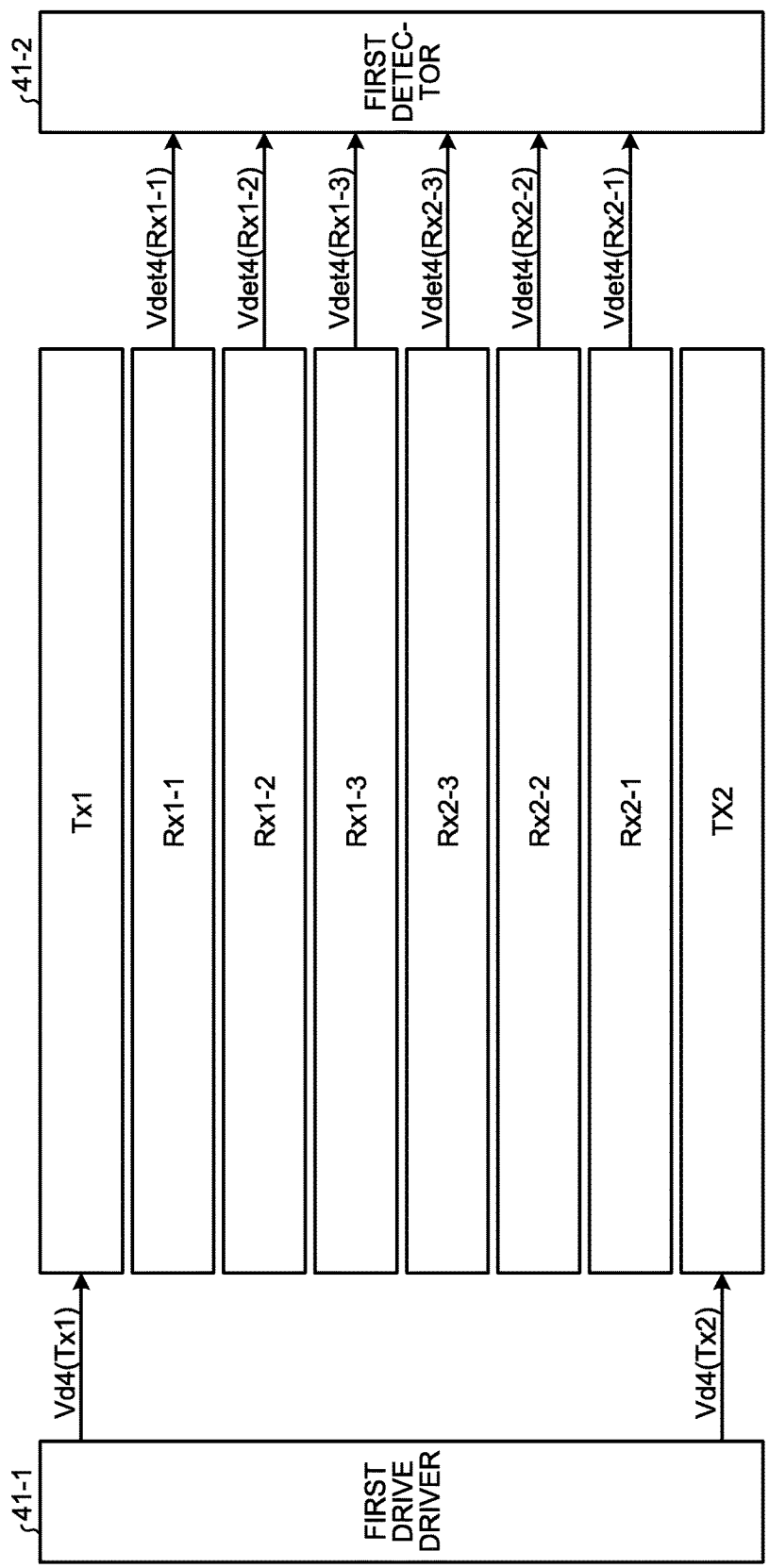
FIG. 26 is a diagram of an example of an electric coupling state of the first electrode and the second electrode and the detector during force calculation processing by the touch detection function-equipped display apparatus according to the third embodiment.
Figure 27:
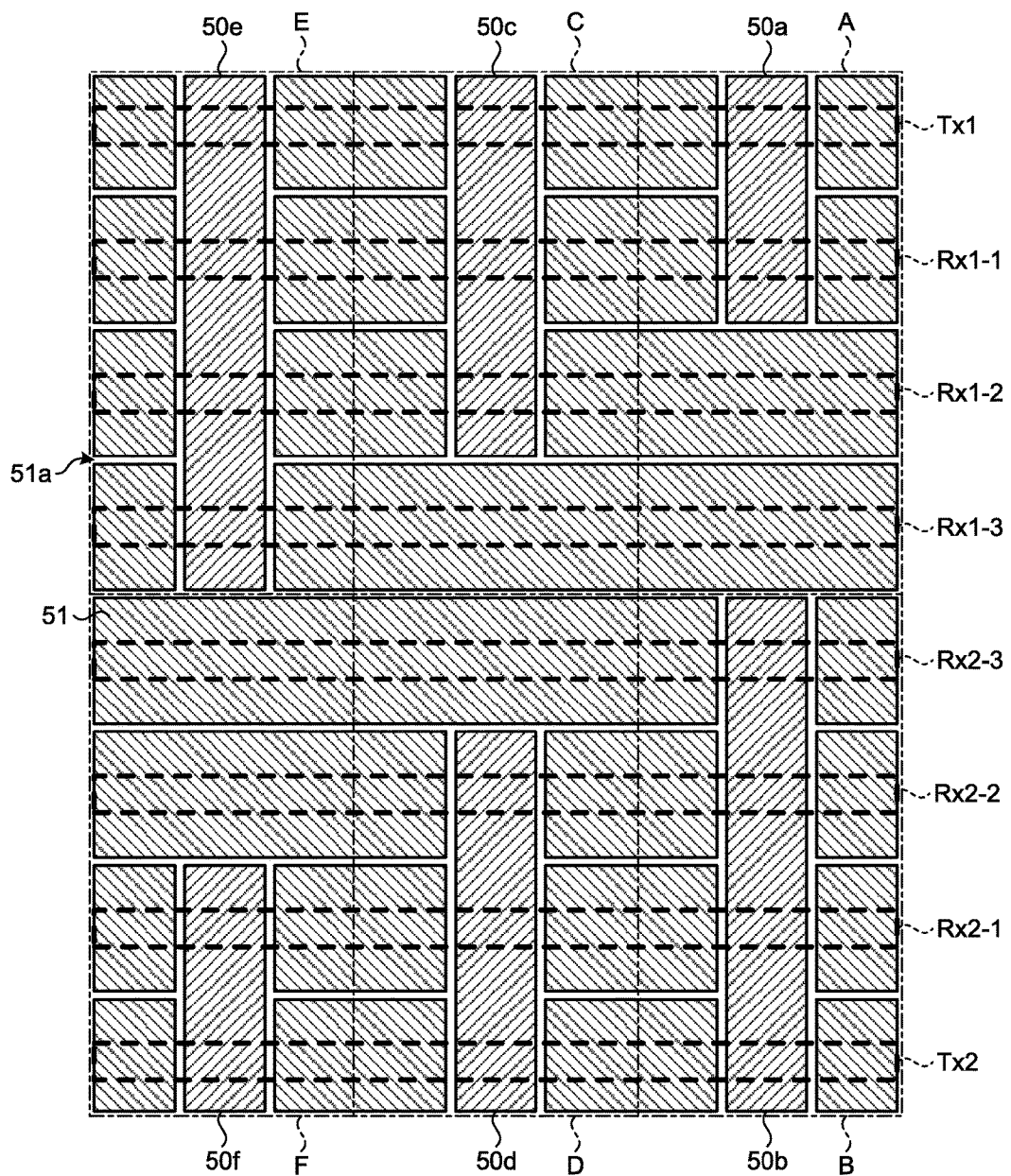
FIG. 27 is a diagram of an example of an arrangement pattern of electrodes in the touch detection function-equipped display apparatus according to the third embodiment.

FIG. 25 is a sectional view of a schematic sectional structure of a touch detection function-equipped display apparatus according to the third embodiment. FIG. 26 is a diagram of an example of an electric coupling state of the first electrode and the second electrode and the detector during force calculation processing by the touch detection function-equipped display apparatus according to the third embodiment. FIG. 27 is a diagram of an example of an arrangement pattern of electrodes in the touch detection function-equipped display apparatus according to the third embodiment. The same components as those described in the first embodiment and the second embodiment are denoted by the same symbols, and a duplicate description is omitted. The pixel arrangement of the touch detection function-equipped display apparatus according to the third embodiment, a specific description of the arrangement pattern of the electrodes in the touch detection function-equipped display apparatus according to the third embodiment, and a detection value in the arrangement pattern of the electrodes in the touch detection function-equipped display apparatus according to the third embodiment and specific examples thereof are similar to those of the first embodiment, the first modification of the first embodiment, the second modification of the first embodiment, the third modification of the first embodiment, and the second embodiment, and a duplicate description is omitted. Although the example illustrated in FIG. 27 illustrates an example in which eight detection electrodes TDL are included, the number of the detection electrodes TDL is not limited to this number.

As illustrated in FIG. 25, in this touch detection function-equipped display apparatus 1*b* according to the third embodiment, a touch detection function-equipped display device 10*b* includes a cover glass 91 above the counter substrate 3, that is, on the image display face side of the touch detection function-equipped display device 10*b*. The floating electrodes 50 are provided on this cover glass 91. These floating electrodes 50 correspond to the third electrode E3 in FIG. 3 and FIG. 6.

In the third embodiment, the floating electrodes 50 (the third electrode E3), the detection electrodes TDL, and the drive electrodes COML are provided in this order from the image display face side of the touch detection function-equipped display device 10*b*. The floating electrodes 50 (the third electrode E3) are provided apart from the counter substrate 3 including the detection electrodes TDL via a gap 92.

The gap 92 may be an air layer (an air gap) or an insulating optical transparent adhesive layer having translucency such as an insulating optically clear adhesive (OCA), for example.

A conductive material having translucency such as indium tin oxide (ITO) is used for the floating electrodes 50 (the third electrode E3).

In the third embodiment, in the configuration, unlike the first embodiment and the second embodiment, the detection electrodes TDL are caused to function as the first electrode E1 and the second electrode E2 illustrated in FIG. 3 and FIG. 6 to perform the first force calculation processing. In the third embodiment, the floating electrodes 50 correspond to the third electrode E3 illustrated in FIG. 3 and FIG. 6 as described above. In other words, the detection apparatus according to the third embodiment includes the first electrode E1 and the second electrode E2 by the detection electrodes TDL, the third electrode E3 by the floating electrodes 50, and the first drive driver 41-1 and the first detector 42-1 in the detector 40.

In the third embodiment, owing to the gap 92 provided in between the cover glass 91 and the counter substrate 3, the cover glass 91 becomes deformed as a result of the display area 100 being pressed, and the distance (spacing) d between the detection electrodes TDL (the first electrode E1 and the second electrode E2) and the floating electrodes 50 (the third electrode E3) changes. The absolute value $|\Delta V|$ of the voltage difference between the waveform $V_0$ and the waveform $V_1$ caused by the change in the distance (spacing) d between these detection electrodes TDL (the first electrode E1 and the second electrode E2) and the floating electrodes 50 (the third electrode E3), that is, the change in the output signal along with the change in the capacitance of the combined capacitance element C1 including the first capacitance element C11 including the first electrode E1 and the third electrode E3 and the second capacitance element C12 including the second electrode E2 and the third electrode E3 that are coupled to each other in series is detected, whereby the force to the display area 100 can be calculated similarly to the first embodiment and the second embodiment.

In the third embodiment, the floating electrodes 50 (the third electrode E3) are provided above the detection electrodes TDL, that is, on the image display face side of the touch detection function-equipped display device 10*b*. Consequently, the floating electrodes 50 (the third electrode E3) formed of the conductive material having translucency such as indium tin oxide (ITO) may be visually recognized. Consequently, as illustrated in FIG. 27, dummy electrodes 51 formed of a conductive material having translucency such as ITO similar to the floating electrodes 50 (the third electrode E3) are preferably provided at areas in which the floating electrodes 50 (the third electrode E3) are not provided within the display area 100. The dummy electrodes 51 include slits 51*a* so as not to form the combined capacitance element C1 by the first electrode E1 and the second electrode E2.

The example illustrated in FIG. 26 illustrates an example in which, among eight detection electrodes TDL, the detection electrodes TDL positioned at both ends of the arrangement direction of the detection electrodes TDL are designated as the first electrode E1, whereas the other detection electrodes TDL are designated as the second electrode E2, thus causing the detection electrodes TDL to have respective roles during touch detection. In the example illustrated in FIG. 26, the eight detection electrodes TDL are referred to as the transmission electrode Tx1 as the first electrode E1; the reception electrode Rx1-1, the reception electrode Rx1-2, the reception electrode Rx1-3, the reception electrode Rx2-3, the reception electrode Rx2-2, and the reception electrode Rx2-1 as the second electrode E2; and the transmission electrode Tx2 as the first electrode E1 in order from the top detection electrode TDL.

The first drive driver 41-1 applies a fourth drive signal Vd4 (Tx1) to the transmission electrode Tx1, whereas the first drive driver 41-1 applies a fourth drive signal Vd4 (Tx2) to the transmission electrode Tx2.

The reception electrode Rx1-1 outputs a fourth detection signal Vdet4 (Rx1-1) to the first detector 42-1, the reception electrode Rx1-2 outputs a fourth detection signal Vdet4 (Rx1-2) to the first detector 42-1, the reception electrode Rx1-3 outputs a fourth detection signal Vdet4 (Rx1-3) to the first detector 42-1, the reception electrode Rx2-3 outputs a fourth detection signal Vdet4 (Rx2-3) to the first detector 42-1, the reception electrode Rx2-2 outputs a fourth detection signal Vdet4 (Rx2-2) to the first detector 42-1, and the reception electrode Rx2-1 outputs a fourth detection signal Vdet4 (Rx2-1) to the first detector 42-1.

The example illustrated in FIG. 26 illustrates an example of the arrangement pattern in which the third electrode E3 (the floating electrodes 50a, 50b, 50c, 50d, 50e, and 50f) is arranged facing the first electrode E1 (the transmission electrodes Tx1 and Tx2) and the second electrode E2 (the reception electrode Rx1-1, Rx1-2, Rx1-3, Rx2-3, Rx2-2, and Rx2-1). More specifically, a detection electrode TDL formation area is divided into six areas including up-and-down two rows and right-and-left three columns; the floating electrode 50a is arranged astride the transmission electrode Tx1 and the reception electrode Rx1-1 in the upper-row, right area A in FIG. 27. The floating electrode 50b is arranged astride the transmission electrode Tx2 and the reception electrodes Rx2-1, Rx2-2, and Rx2-3 in the lower-row, right area B in FIG. 27. The floating electrode 50c is arranged astride the transmission electrode Tx1 and the reception electrodes Rx1-1 and Rx1-2 in the upper-row, central area C in FIG. 27. The floating electrode 50d is arranged astride the transmission electrode Tx2 and the reception electrodes Rx2-1 and Rx2-2 in the lower-row, central area D in FIG. 27. The floating electrode 50e is arranged astride the transmission electrode Tx1 and the reception electrodes Rx1-1, Rx1-2, and Rx1-3 in the upper-row, left area E in FIG. 27. The floating electrode 50f is arranged astride the transmission electrode Tx2 and the reception electrode Rx2-1 in the lower-row, left area F in FIG. 27.

In the configuration illustrated in FIG. 26 and FIG. 27, combinations forming the combined capacitance element C1 (refer to FIG. 5) via the third electrode E3 (the floating electrodes 50a, 50b, 50c, 50d, 50e, and 50f) are similar to those of the first embodiment, and a detailed description thereof is omitted in this example.

The touch panel 30 outputs the fourth detection signal Vdet4 (Rx1-1) from the reception electrode Rx1-1, outputs the fourth detection signal Vdet4 (Rx1-2) from the reception electrode Rx1-2, outputs the fourth detection signal Vdet4 (Rx1-3) from the reception electrode Rx1-3, outputs the fourth detection signal Vdet4 (Rx2-1) from the reception electrode Rx2-1, outputs the fourth detection signal Vdet4 (Rx2-2) from the reception electrode Rx2-2, and outputs the fourth detection signal Vdet4 (Rx2-3) from the reception electrode Rx2-3. These fourth detection signals Vdet4 (Rx1-1), Vdet4 (Rx1-2), Vdet4 (Rx1-3), Vdet4 (Rx2-1), Vdet4 (Rx2-2), and Vdet4 (Rx2-3) are supplied to the first detector 42-1 of the detector 40.

The first detector 42-1 amplifies the fourth detection signals Vdet4 (Rx1-1), Vdet4 (Rx1-2), Vdet4 (Rx1-3), Vdet4 (Rx2-1), Vdet4 (Rx2-2), and Vdet4 (Rx2-3) supplied from the touch panel 30.

The first A/D converter 43-1 A/D converts signals input from the first detector 42-1 and outputs the converted signals to the signal processor 44.

The subsequent processing is similar to that of the first embodiment. In other words, the signal processor 44 appropriately analyzes the detection values $|\Delta V|$ in the respective reception electrodes Rx1-1, Rx1-2, Rx1-3, Rx2-1, Rx2-2, and Rx2-3, whereby even when a force is applied to deform a plurality of areas of the touch detection function-equipped display device 10b, or even when forces are applied to a plurality of places, the force(s) at any position(s) of the display area 100 can be calculated as described above.

Consequently, the signal processor 44 can appropriately calculate the force at the touch detection position detected by the first touch position detection processing, the second touch position detection processing, and the third touch position detection processing.

Although the embodiments describe the example in which three reception electrodes Rx1-1, Rx1-2, and Rx1-3 (the second electrode E2) are arranged by the side of the transmission electrode Tx1 (the first electrode E1), and three reception electrodes Rx2-1, Rx2-2, and Rx2-3 (the second electrode E2) are arranged by the side of the transmission electrode Tx2 (the first electrode E1) (refer to FIG. 10 and FIG. 11, FIG. 13 and FIG. 14), the example in which one reception electrode Rx1 (the second electrode E2) is arranged by the side of the transmission electrode Tx1 (the first electrode E1), one reception electrode Rx2 (the second electrode E2) is arranged by the side of the transmission electrode Tx2 (the first electrode E1), one reception electrode Rx3 (the second electrode E2) is arranged by the side of the transmission electrode Tx3 (the first electrode E1), and one reception electrode Rx4 (the second electrode E2) is arranged by the side of the transmission electrode Tx4 (the first electrode E1) (refer to FIG. 16 and FIG. 17), and the example in which two reception electrodes Rx1-0 and Rx1-1 (the second electrode E2) are arranged by the side of the transmission electrode Tx1 (the first electrode E1), two reception electrodes Rx2-0 and Rx2-1 (the second electrode E2) are arranged by the side of the transmission electrode Tx2 (the first electrode E1), and two reception electrodes Rx3-0 and Rx3-1 (the second electrode E2) are arranged by the side of the transmission electrode Tx3 (the first electrode E1) (refer to FIG. 19 and FIG. 20), the number and the arrangement of the first electrode E1 and the second electrode E2 are not limited to the above examples. At least either the first electrode E1 or the second electrode E2 includes a plurality of electrodes, whereby a force in the arrangement direction and the extension direction of the first electrode E1 and the second electrode E2 can be calculated.

The number of the second electrode E2 arranged by the side of the first electrode E1 is not limited to one (refer to FIG. 16 and FIG. 17), two (refer to FIG. 19 and FIG. 20), and three (refer to FIG. 10 and FIG. 11, FIG. 13 and FIG. 14), and n (n is a natural number) second electrode(s) E2 may be arranged by the side of one first electrode E1.

Although the embodiments describe the examples in which all the drive electrodes COML or the detection electrodes TDL are assigned to the first electrode E1 or the second electrode E2, part of the drive electrodes COML or the detection electrodes TDL may be assigned to the first electrode E1 or the second electrode E2 depending on required accuracy in the force calculation processing.

As described above, the detection apparatus according to the embodiments provides the third electrode E3 (the floating electrodes) arranged facing the first electrode E1 and the second electrode E2 provided in parallel with each other via the spacing d astride the first electrode E1 and the second electrode E2, applies the drive signal to the first electrode E1 to detect the output signal appearing in the second electrode E2 concerning the combined capacitance element C1 including the first capacitance element C11 formed between the first electrode E1 and the third electrode E3 and the second capacitance element C12 formed between the second electrode E2 and the third electrode E3 that are coupled to each other, and detects the change in the output signal along with the change in the capacitance of the combined capacitance element C1 corresponding to the change in the spacing d between the first electrode E1 and the second electrode E2 and the third electrode E3, whereby a change level in the spacing d between the first electrode E1 and the second electrode E2 and the third electrode E3 can be calculated.

In other words, the detection apparatus described above is used for the touch detection function-equipped display apparatus, part of or all the drive electrodes COML or the detection electrodes TDL are caused to function as the first electrode E1 and the second electrode E2, and the change in the output signal along with the change in the capacitance of the combined capacitance element C1 is detected, whereby the force at any position of the display area 100 can be calculated, and the force at the touch detection position detected by the first touch position detection processing, the second touch position detection processing, and the third touch position detection processing can be appropriately calculated.

The present embodiment can achieve a detection apparatus and a touch detection function-equipped display apparatus that can appropriately calculate a force at the detection position of a touch operation.

Although the embodiments have been described, the above details do not limit the present invention. The components of the present invention include ones that those skilled in the art can easily think of, substantially the same ones, and ones in what is called the scope of equivalence. Further, the components can be combined as appropriate. Various omissions, replacements, and modifications of the components can be made without departing from the gist of the present invention.

The present invention can also be configured as follows:
(1) A detection apparatus includes
at least one first electrode,
at least one second electrode provided at a position that does not overlap with the at least one first electrode,
a third electrode arranged facing the at least one first electrode and the at least one second electrode via a spacing, and
a detector configured to apply a drive signal to the at least one first electrode and detect an output signal appearing in the at least one second electrode.
(2) The detection apparatus according to (1), in which
the at least one first electrode and the at least one second electrode are provided extending in one direction on a first plane within a certain area, and
the third electrode is provided crossing the at least one first electrode and the at least one second electrode on a second plane parallel to the first plane.
(3) The detection apparatus according to (1) or (2), in which at least either the at least one first electrode or the at least one second electrode includes a plurality of electrodes.
(4) The detection apparatus according to (3), in which the at least one second electrode including n (n is a natural number) second electrode(s) is arranged by the side of the at least one first electrode consisting of one first electrode.
(5) The detection apparatus according to (4), in which
a first capacitance element including the at least one first electrode and the third electrode and a second capacitance element including the at least one second electrode and the third electrode are coupled to each other in series to form a combined capacitance element, and
the at least one second electrode forms the combined capacitance element together with the at least one first electrode consisting of one first electrode.
(6) The detection apparatus according to (4), in which
a first capacitance element including the at least one first electrode and the third electrode and a second capacitance element including the at least one second electrode and the third electrode are coupled to each other in series to form a combined capacitance element, and
the at least one second electrode forms the combined capacitance element together with the at least one first electrode including a plurality of first electrodes.
(7) A touch detection function-equipped display apparatus includes a touch detection function-equipped display device including drive electrodes including a plurality of electrode patterns extending in one direction to give common potential to pixel electrodes arranged in a matrix, within a display area and detection electrodes including electrode patterns extending in a direction crossing the extension direction of the electrode patterns of the drive electrodes to detect a touch position within the display area, the touch detection function-equipped display device configured to detect a position of a touch operation within the display area using the drive electrodes and the detection electrodes, the touch detection function-equipped display apparatus includes a detection apparatus including
at least one first electrode,
at least one second electrode provided at a position that does not overlap with the at least one first electrode,
a third electrode arranged facing the at least one first electrode and the at least one second electrode via a spacing, and
a detector configured to apply a drive signal to the at least one first electrode and detect an output signal appearing in the at least one second electrode,
either the drive electrodes and the detection electrodes are configured to function as the at least one first electrode and the at least one second electrode, and
the detection apparatus are configured to calculate a force applied to the touch detection function-equipped display device at a detection position of the touch operation in accordance with a change in the output signal.
(8) The touch detection function-equipped display apparatus according to (7), in which
the at least one first electrode and the at least one second electrode are provided extending in one direction on a first plane within a certain area, and
the third electrode is provided crossing the at least one first electrode and the at least one second electrode on a second plane parallel to the first plane.

(9) The touch detection function-equipped display apparatus according to (7) or (8), in which at least either the at least one first electrode or the at least one second electrode includes a plurality of electrodes.
(10) The touch detection function-equipped display apparatus according to (9), in which the at least one second electrode including n (n is a natural number) second electrode(s) is arranged by the side of the at least one first electrode consisting of one first electrode.
(11) The touch detection function-equipped display apparatus according to (10), in which
a first capacitance element including the at least one first electrode and the third electrode and a second capacitance element including the at least one second electrode and the third electrode are coupled to each other in series to form a combined capacitance element, and
the at least one second electrode forms the combined capacitance element together with the at least one first electrode consisting of one first electrode.
(12) The touch detection function-equipped display apparatus according to (10), in which
a first capacitance element including the at least one first electrode and the third electrode and a second capacitance element including the at least one second electrode and the third electrode are coupled to each other in series to form a combined capacitance element, and
the at least one second electrode forms the combined capacitance element together with the at least one first electrode including a plurality of first electrodes.
(13) The touch detection function-equipped display apparatus according to (7), in which
the touch detection function-equipped display device includes the detection electrodes, the drive electrodes, and the third electrode in this order from an image display face side,
the drive electrodes are configured to function as the at least one first electrode and the at least one second electrode, and
the third electrode is provided on a face of a backlight apparatus provided apart from the touch detection function-equipped display device via a gap, the face being opposite to an image display face side.
(14) The touch detection function-equipped display apparatus according to (7), in which
the touch detection function-equipped display device includes the detection electrodes, the third electrode, and the drive electrodes in this order from an image display face side,
the drive electrodes are configured to function as the at least one first electrode and the at least one second electrode, and
the third electrode is provided apart from the drive electrodes via a liquid crystal layer.
(15) The touch detection function-equipped display apparatus according to (14), in which the third electrode is provided overlapping with the detection electrodes in a direction perpendicular to the image display face.
(16) The touch detection function-equipped display apparatus according to (14) or (15), in which the third electrode is provided along a light shielding area that separates pixel areas provided for each of the pixel electrodes.
(17) The touch detection function-equipped display apparatus according to (16), in which the third electrode includes a mesh-like metallic wire.
(18) The touch detection function-equipped display apparatus according to (14) or (15), in which the third electrode is a conductive light shielding film forming a light shielding area that separates pixel areas provided for each of the pixel electrodes.
(19) The touch detection function-equipped display apparatus according to (7), in which
the touch detection function-equipped display device includes the third electrode, the detection electrodes, and the drive electrodes in this order from an image display face side,
the detection electrodes are configured to function as the at least one first electrode and the at least one second electrode, and
the third electrode is provided apart from the detection electrodes via a gap.
(20) The touch detection function-equipped display apparatus according to (19), in which the gap is an air layer.
(21) The touch detection function-equipped display apparatus according to (19), in which the gap is an insulating optical transparent adhesive layer having translucency.
(22) The touch detection function-equipped display apparatus according to (19) to (21), in which the third electrode is provided on a cover glass that covers an image display face.
(23) The touch detection function-equipped display apparatus according to (22), in which the third electrode is formed of a conductive material having translucency.
(24) The touch detection function-equipped display apparatus according to (22), in which dummy electrodes formed of a conductive material having translucency are provided at areas in which the third electrode is not provided within the display area.

What is claimed is:
1. A detection apparatus comprising:
at least one first electrode;
at least one second electrode provided at a position that does not overlap with the at least one first electrode;
a third electrode arranged facing the at least one first electrode and the at least one second electrode via a spacing; and
a detector configured to apply a drive signal to the at least one first electrode and detect an output signal appearing in the at least one second electrode,
wherein
at least either the at least one first electrode or the at least one second electrode comprises a plurality of electrodes,
the at least one second electrode comprising n (n is a natural number) second electrode(s) is arranged by the side of the at least one first electrode consisting of one first electrode,
a first capacitance element comprising the at least one first electrode and the third electrode and a second capacitance element comprising the at least one second electrode and the third electrode are coupled to each other in series to form a combined capacitance element, and
the at least one second electrode forms the combined capacitance element together with the at least one first electrode consisting of one first electrode.
2. The detection apparatus according to claim 1, wherein
the at least one first electrode and the at least one second electrode are provided extending in one direction on a first plane within a certain area, and
the third electrode is provided crossing the at least one first electrode and the at least one second electrode on a second plane parallel to the first plane.
3. A detection apparatus comprising:
at least one first electrode;

at least one second electrode provided at a position that does not overlap with the at least one first electrode;
a third electrode arranged facing the at least one first electrode and the at least one second electrode via a spacing; and
a detector configured to apply a drive signal to the at least one first electrode and detect an output signal appearing in the at least one second electrode,
wherein
at least either the at least one first electrode or the at least one second electrode comprises a plurality of electrodes,
the at least one second electrode comprising n (n is a natural number) second electrode(s) is arranged by the side of the at least one first electrode consisting of one first electrode,
a first capacitance element comprising the at least one first electrode and the third electrode and a second capacitance element comprising the at least one second electrode and the third electrode are coupled to each other in series to form a combined capacitance element, and
the at least one second electrode forms the combined capacitance element together with the at least one first electrode comprising a plurality of first electrodes.

4. A touch detection function-equipped display apparatus comprising a touch detection function-equipped display device comprising drive electrodes comprising a plurality of electrode patterns extending in one direction to give common potential to pixel electrodes arranged in a matrix, within a display area and detection electrodes comprising electrode patterns extending in a direction crossing the extension direction of the electrode patterns of the drive electrodes to detect a touch position within the display area, the touch detection function-equipped display device configured to detect a position of a touch operation within the display area using the drive electrodes and the detection electrodes, the touch detection function-equipped display apparatus comprising a detection apparatus comprising:
at least one first electrode;
at least one second electrode provided at a position that does not overlap with the at least one first electrode;
a third electrode arranged facing the at least one first electrode and the at least one second electrode via a spacing; and
a detector configured to apply a drive signal to the at least one first electrode and detect an output signal appearing in the at least one second electrode,
wherein
either the drive electrodes and the detection electrodes configured to function as the at least one first electrode and the at least one second electrode,
the detection apparatus configured to calculate a force applied to the touch detection function-equipped display device at a detection position of the touch operation in accordance with a change in the output signal,
at least either the at least one first electrode or the at least one second electrode comprises a plurality of electrodes,
the at least one second electrode comprising n (n is a natural number) second electrode(s) is arranged by the side of the at least one first electrode consisting of one first electrode,
a first capacitance element comprising the at least one first electrode and the third electrode and a second capacitance element comprising the at least one second electrode and the third electrode are coupled to each other in series to form a combined capacitance element, and
the at least one second electrode forms the combined capacitance element together with the at least one first electrode consisting of one first electrode.

5. The detection apparatus according to claim 3, wherein the at least one first electrode and the at least one second electrode are provided extending in one direction on a first plane within a certain area, and
the third electrode is provided crossing the at least one first electrode and the at least one second electrode on a second plane parallel to the first plane.

6. A touch detection function-equipped display apparatus comprising a touch detection function-equipped display device comprising drive electrodes comprising a plurality of electrode patterns extending in one direction to give common potential to pixel electrodes arranged in a matrix, within a display area and detection electrodes comprising electrode patterns extending in a direction crossing the extension direction of the electrode patterns of the drive electrodes to detect a touch position within the display area, the touch detection function-equipped display device configured to detect a position of a touch operation within the display area using the drive electrodes and the detection electrodes, the touch detection function-equipped display apparatus comprising a detection apparatus comprising:
at least one first electrode;
at least one second electrode provided at a position that does not overlap with the at least one first electrode;
a third electrode arranged facing the at least one first electrode and the at least one second electrode via a spacing; and
a detector configured to apply a drive signal to the at least one first electrode and detect an output signal appearing in the at least one second electrode,
wherein
either the drive electrodes and the detection electrodes configured to function as the at least one first electrode and the at least one second electrode,
the detection apparatus configured to calculate a force applied to the touch detection function-equipped display device at a detection position of the touch operation in accordance with a change in the output signal,
at least either the at least one first electrode or the at least one second electrode comprises a plurality of electrodes,
the at least one second electrode comprising n (n is a natural number) second electrode(s) is arranged by the side of the at least one first electrode consisting of one first electrode,
a first capacitance element comprising the at least one first electrode and the third electrode and a second capacitance element comprising the at least one second electrode and the third electrode are coupled to each other in series to form a combined capacitance element, and
the at least one second electrode forms the combined capacitance element together with the at least one first electrode comprising a plurality of first electrodes.

7. A touch detection function-equipped display apparatus comprising a touch detection function-equipped display device comprising drive electrodes comprising a plurality of electrode patterns extending in one direction to give common potential to pixel electrodes arranged in a matrix, within a display area and detection electrodes comprising electrode patterns extending in a direction crossing the extension direction of the electrode patterns of the drive electrodes to detect a touch position within the display area, the touch detection function-equipped display device configured to detect a position of a touch operation within the display area using the drive electrodes and the detection electrodes, the touch detection function-equipped display apparatus comprising a detection apparatus comprising:
- at least one first electrode;
- at least one second electrode provided at a position that does not overlap with the at least one first electrode;
- a third electrode arranged facing the at least one first electrode and the at least one second electrode via a spacing; and
- a detector configured to apply a drive signal to the at least one first electrode and detect an output signal appearing in the at least one second electrode, wherein either the drive electrodes and the detection electrodes configured to function as the at least one first electrode and the at least one second electrode, the detection apparatus configured to calculate a force applied to the touch detection function-equipped display device at a detection position of the touch operation in accordance with a change in the output signal, the touch detection function-equipped display device comprises the detection electrodes, the drive electrodes, and the third electrode in this order from an image display face side, the drive electrodes are configured to function as the at least one first electrode and the at least one second electrode, and the third electrode is provided on a face of a backlight apparatus provided apart from the touch detection function-equipped display device via a gap, the face being opposite to an image display face side.

8. A touch detection function-equipped display apparatus comprising a touch detection function-equipped display device comprising drive electrodes comprising a plurality of electrode patterns extending in one direction to give common potential to pixel electrodes arranged in a matrix, within a display area and detection electrodes comprising electrode patterns extending in a direction crossing the extension direction of the electrode patterns of the drive electrodes to detect a touch position within the display area, the touch detection function-equipped display device configured to detect a position of a touch operation within the display area using the drive electrodes and the detection electrodes, the touch detection function-equipped display apparatus comprising a detection apparatus comprising:
- at least one first electrode;
- at least one second electrode provided at a position that does not overlap with the at least one first electrode;
- a third electrode arranged facing the at least one first electrode and the at least one second electrode via a spacing; and
- a detector configured to apply a drive signal to the at least one first electrode and detect an output signal appearing in the at least one second electrode, wherein either the drive electrodes and the detection electrodes configured to function as the at least one first electrode and the at least one second electrode, the detection apparatus configured to calculate a force applied to the touch detection function-equipped display device at a detection position of the touch operation in accordance with a change in the output signal, the touch detection function-equipped display device comprises the detection electrodes, the third electrode, and the drive electrodes in this order from an image display face side, the drive electrodes are configured to function as the at least one first electrode and the at least one second electrode, and the third electrode is provided apart from the drive electrodes via a liquid crystal layer.

9. The touch detection function-equipped display apparatus according to claim 8, wherein the third electrode is provided overlapping with the detection electrodes in a direction perpendicular to the image display face.

10. The touch detection function-equipped display apparatus according to claim 8, wherein the third electrode is provided along a light shielding area that separates pixel areas provided for each of the pixel electrodes.

11. A touch detection function-equipped display apparatus comprising a touch detection function-equipped display device comprising drive electrodes comprising a plurality of electrode patterns extending in one direction to give common potential to pixel electrodes arranged in a matrix, within a display area and detection electrodes comprising electrode patterns extending in a direction crossing the extension direction of the electrode patterns of the drive electrodes to detect a touch position within the display area, the touch detection function-equipped display device configured to detect a position of a touch operation within the display area using the drive electrodes and the detection electrodes, the touch detection function-equipped display apparatus comprising a detection apparatus comprising:
- at least one first electrode;
- at least one second electrode provided at a position that does not overlap with the at least one first electrode;
- a third electrode arranged facing the at least one first electrode and the at least one second electrode via a spacing; and
- a detector configured to apply a drive signal to the at least one first electrode and detect an output signal appearing in the at least one second electrode, wherein either the drive electrodes and the detection electrodes configured to function as the at least one first electrode and the at least one second electrode, the detection apparatus configured to calculate a force applied to the touch detection function-equipped display device at a detection position of the touch operation in accordance with a change in the output signal, the touch detection function-equipped display device comprises the third electrode, the detection electrodes, and the drive electrodes in this order from an image display face side, the detection electrodes are configured to function as the at least one first electrode and the at least one second electrode, and the third electrode is provided apart from the detection electrodes via a gap.

12. The touch detection function-equipped display apparatus according to claim 11, wherein the gap is an air layer.

13. The touch detection function-equipped display apparatus according to claim 11, wherein the third electrode is provided on a cover glass that covers an image display face.

14. The touch detection function-equipped display apparatus according to claim 13, wherein the third electrode is formed of a conductive material having translucency.

* * * * *